United States Patent
Tsuzuki et al.

[19]

[11] Patent Number: 6,018,198

[45] Date of Patent: Jan. 25, 2000

[54] HYBRID DRIVE APPARATUS FOR VEHICLE

[75] Inventors: Shigeo Tsuzuki; Kiyoshi Kurita; Yoshinori Matsushita, all of Anjo, Japan

[73] Assignee: Aisin AW Co., Ltd., Anjo, Japan

[21] Appl. No.: 09/135,643

[22] Filed: Aug. 18, 1998

[30] Foreign Application Priority Data

Aug. 29, 1997 [JP] Japan .................................. 9-249338

[51] Int. Cl.[7] .................................................. F02N 11/00
[52] U.S. Cl. ........................... 290/17; 290/40 C; 322/16; 180/65.2
[58] Field of Search ...................... 290/17, 40 R, 290/40 B, 40 C; 322/16; 180/165, 65.2; 123/331

[56] References Cited

U.S. PATENT DOCUMENTS

| | | | |
|---|---|---|---|
| 5,343,970 | 9/1994 | Saverinsky | 180/65.2 |
| 5,713,814 | 2/1998 | Hara et al. | 477/5 |
| 5,720,690 | 2/1998 | Hara et al. | 477/20 |
| 5,735,770 | 4/1998 | Omote et al. | 477/5 |
| 5,801,499 | 9/1998 | Tsuzuki et al. | 318/141 |
| 5,818,116 | 10/1998 | Nakae et al. | 290/38 R |
| 5,839,533 | 11/1998 | Mikami et al. | 180/165 |
| 5,846,155 | 12/1998 | Taniguchi et al. | 477/2 |
| 5,856,709 | 1/1999 | Ibaraki et al. | 290/45 |
| 5,951,614 | 9/1999 | Tabata et al. | 701/54 |

*Primary Examiner*—Nicholas Ponomarenko
*Attorney, Agent, or Firm*—Oliff & Berridge, PLC

[57] ABSTRACT

A hybrid drive apparatus for a vehicle which is capable of improving the response in restarting an engine during the running of a vehicle. As a result, a shock due to deceleration can be reduced. The hybrid drive apparatus for a vehicle incorporates an engine, a motor generator, a clutch, a transmission unit and a control unit for controlling the other elements. The control unit incorporates a standby control device for realizing a constant cranking characteristic to improve the starting response at the start of the engine by transmitting the power of the motor generator to the engine and controlling the engagement pressure of the clutch, thus revolving the engine to a cranking start position.

26 Claims, 16 Drawing Sheets

HYBRID DRIVE APPARATUS FOR VEHICLE

BACKGROUND OF THE INVENTION

1. Field of the Invention

The invention relates to a hybrid drive apparatus for a vehicle incorporating an engine and a motor generator as power sources thereof, and more particularly, to an art for restarting an engine that has been stopped in a state where the vehicle is driven by a motor generator for reducing fuel consumption.

2. Description of the Related Art

A hybrid drive apparatus is known as a drive apparatus for a vehicle which incorporates a combustion engine (hereinafter called an "engine") and an electric motor generator (hereinafter called a "motor generator") each serving as a power source. The engine, one of the power sources, is characterized in that the decrease rate of efficiency is rapidly raised to match the decrease rate in the load in a lighter load region.

In order to reduce fuel consumption for energy saving, a drive apparatus has been disclosed which is adapted to a method of automatically stopping an engine and driving the vehicle by a motor generator at a light load, that is, the state where the amount of depression of an accelerator (hereinafter called an "accelerator opening") assumes a small value. In the above-mentioned method, the engine has to be automatically restarted when the accelerator opening is set to be more than the small value. At this time, while a portion of the driving force of the motor generator is used for running the vehicle, another portion is used to start the engine. Therefore, there is a decrease in the driving force due to the cranking load for the engine which gives the driver of the vehicle a feeling of excessive deceleration. Thus, a method is required to overcome the aforementioned problem by reducing the shock resulting from deceleration at the time of restarting the engine.

As a measure for preventing shock owing to deceleration, a technology is known to sweep up the engagement pressure of the clutch between the motor generator and the engine and to recognize a changing rate in the slight revolution of the motor generator caused by the increase in transmission force of the torque in the clutch engagement. Then, the output torque of the motor generator rises.

The cranking load generated when restarting the engine becomes a synthetic torque combining the torque of resistance generated by intake, compression and exhaust strokes in each cylinder, the torque corresponding to mechanical dragging resistance, and the torque for operating auxiliary units, such as an air conditioner, an alternator, a water pump and an oil pump with the inertia torque required to accelerate the stopped engine. Above all, the load generated by the intake/exhaust operations becomes a periodically oscillating torque as indicated by lines having different symbols respectively corresponding to the cylinders shown in FIG. 12. The total value of the aforementioned torque has a characteristic indicated by a solid line.

The actual cranking torque is characterized in that it is sharply increased to assume an excessive high torque value only at the start of revolution and then it assumes a substantially constant value as shown in FIG. 13. This is because inertia torque as a resistance against the revolutions, in turn, is caused to restrain the oscillation of the torque by flywheel inertia after the engine has been started. Therefore, the cranking torque which is needed in order to maintain revolutions at a predetermined speed may assume an average value.

Accordingly, a technology has been suggested to prevent generation of any load during intake/exhaust operations until the engine has been restarted to reach a certain number of revolutions in accordance with the characteristic of the cranking torque. Thus, the peak value of the torque load is reduced so as to decrease the cranking torque applied to the motor generator.

However, the latter technology requires reorganization of the engine as well as complicated control. Therefore, many problems have to be solved for a practical application. Meanwhile the former technology has a problem caused by the characteristic of the cranking torque. That is, the start-up characteristic of the cranking torque having the aforementioned periodically oscillating torque component is changed because the position of the peak is shifted from the crank shaft position at a stop state of the engine, as shown by a chain line, to that shown by the solid line of FIG. 14. As the timing of the generation of the peak torque is shifted as described above, the hydraulic pressure for engaging the clutch has to be changed to correspond to the foregoing capacity. Therefore, very precise control must be performed such that the amount of the increase in output torque from the motor generator is changed to correspond to the foregoing hydraulic pressure. This precise control cannot be performed by a simple control, such as a control using a map. Because the control cannot accurately estimate the oscillating torque component generated by the compression and expansion strokes in the cylinder, a shock is easily caused in an initial stage of starting the engine. What is worse, a satisfactorily high control speed cannot be realized.

SUMMARY OF THE INVENTION

Accordingly, a first object of the invention is to provide a hybrid drive apparatus for a vehicle which is capable of making a cranking characteristic at the restart of the engine constant so that the engine is restarted with a good response under a simple control in a state where the vehicle is driven by the motor generator.

A second object of the invention is to realize a standby state by hydraulic control for making the cranking characteristic constant.

A third object of the invention is to enable the standby state for making the cranking characteristic constant and to realize the subsequent starting in a limited range of output from the motor generator.

In order to prevent a shock owing to the decrease in the driving force at the restart of the engine, a motor generator having a large capacity for outputting a sufficiently great torque must be employed. Moreover, control for increasing the output torque in accordance with the cranking load must be performed. If the motor generator having the large capacity is mounted only to start the engine, the size of the motor generator becomes unnecessarily enlarged. The capacity of an inverter for controlling the motor generator is accordingly increased, leading to the increased capacity of the battery. Thus, the above-mentioned method cannot effectively solve the problems.

Accordingly, a fourth object of the invention is to provide a hybrid drive apparatus for a vehicle which employs a starter motor provided for an engine so as to supplementarily be operated to crank the engine at a satisfactory response without enlarging the motor generator for performing cranking under simple control of the engagement pressure of the clutch.

A fifth object of the invention is to provide a hybrid drive apparatus for a vehicle which is capable of realizing a standby state for making the cranking characteristic constant and subsequent start by a motor generator without using a special auxiliary drive means.

A general method is known, which starts an engine by a starter motor. If the above-mentioned method is simply applied to restart the engine during running of the vehicle, a disturbing noise is generated due to variance in the cranking torque and the starting response cannot satisfy the requirement. Accordingly, a sixth object of the invention is to provide a hybrid drive apparatus for a vehicle which employs a starter motor provided for an engine so as to supplementarily be operated at start-up of the engine revolution requiring substantially high torque at cranking and to enable engine cranking at a good response without enlarging the motor generator for cranking under a simple control of the engagement pressure of the clutch.

When the engine is started only by the motor generator, various methods may be employed to control the engagement pressure of the clutch to increase the number of revolutions of the engine for cranking the engine. If the control of the engagement pressure becomes complicated, a method of the foregoing type cannot practically be employed. Accordingly, a seventh object of the invention is to restart an engine by simply controlling the engagement pressure of the clutch.

When starting the engine only by the motor generator, generation of a deceleration shock owing to cranking of the engine cannot be prevented under the limited output of the motor generator. When the deceleration feeling is limited to fall in a predetermined range, a sensible shock can be prevented. Accordingly, an eighth object of the invention is to restart the engine while preventing reduction in the number of revolutions of a motor generator to satisfy a predetermined range under control of the engagement pressure of a clutch.

As a starter motor provided for the engine is not operated frequently, it is operated in an overload state requiring substantially high electric current. However, when using the starter motor frequently for restarting the engine in the same overload state, there might be deterioration in durability of the starter motor. Accordingly, a ninth object of the invention is to maintain durability of the starter motor by operating the starter motor in a light load state where the cranking torque is compensated by a motor generator such that the operation time is greatly limited.

As described above, the cranking torque for starting the engine becomes high while starting the revolution of the engine and the subsequent torque is decreased. Accordingly, a tenth object of the invention is to simplify the control of the engagement pressure of the clutch for torque transmission by supplementarily operating a starter motor to average the increased output torque of the motor generator all through the engine start-up period.

When the starter motor is supplementarily operated during the revolution start-up period, the increase in the output torque from the motor generator can be decreased all through the engine start period. Accordingly, an eleventh object of the invention is to decrease the torque load of the motor generator for starting the engine and simplifying the output torque control.

As a method for preventing the torque of the motor generator from being used for starting the engine, it might be feasible to employ a method for restarting the engine during running only by the starter motor. If the foregoing method is employed, durability of the starter motor may be deteriorated for the aforementioned reason. Accordingly, a twelfth object of the invention is to maintain the durability of the starter motor even if the starter motor is mainly used and the torque of the motor generator is supplementarily used to restart the engine during running.

A thirteenth object of the invention is to simplify the control of the starter motor under the start-up control.

A fourteenth object of the invention is to restart the engine with good response only by the motor generator torque while suppressing the generation of deceleration shock to a minimum.

A fifteenth object of the invention is to simplify the torque-control of the motor generator torque under starting control in accordance with control of the engagement pressure of the clutch.

A sixteenth object of the invention is to perform the torque-control of the motor generator torque when the standby control is shifted to the starting control using a very simple method.

A seventeenth object of the invention is to improve response of a standby control prior to the starting control by the motor generator.

The drive mode in the conventional hybrid drive apparatus is switched such that a reference is made to a drive mode map stored in a microcomputer of a control unit and having drive regions determined in accordance with the relationship between the degree of accelerator opening and vehicle speed. Moreover, the foregoing switching operation is performed in accordance with the relationship between the degree of accelerator opening at each moment in time and the vehicle speed. An eighteenth object of the invention is to restart the engine by performing a simple control using a map in which the time for starting the standby control has been set.

It is important to confirm start of the engine in order to complete the engine starting control in a period of time as short as possible. Accordingly, a nineteenth object of the invention is to accurately determine the start of the engine.

A twentieth object of the invention is to smoothly finish the engine starting control with the motor generator.

A twenty-first object of the invention is to smoothly shift the motor drive to the engine drive after the engine has been started.

A twenty-second object of the invention is to improve the response of a standby control performed prior to the starting control with the starter motor.

A twenty-third object of the invention is to restart the engine by performing a simple control using a map on which the starting time of the standby control has been set prior to the starting control using the starter motor.

A twenty-fourth object of the invention is to cause the engine to spontaneously revolve at a good timing in a final stage of the starting control by appropriately resuming the fuel supply and performing ignition.

A twenty-fifth object of the invention is to smoothly terminate the engine starting control using a starter motor.

A twenty-sixth object of the invention is to smoothly shift motor drive to engine drive subsequent to the start of the engine under the engine starting control using a starter motor.

To achieve the first object, according to one aspect of the invention, there is provided a hybrid drive apparatus for a vehicle, provided with an engine, a motor generator, a transmission unit capable of transmitting the power of the engine and the motor generator to the wheels, and a control unit for controlling the engine, the motor generator and the transmission of power of the engine and the motor generator to the wheels. The control unit incorporates starting control means for starting the engine when a vehicle is driven in a state where the engine is stopped and power of the motor generator is transmitted to the wheels, and standby control means for performing control to revolve the engine to a cranking start position prior to the start of the engine performed by the starting control means.

To achieve the second object, a hybrid drive apparatus for a vehicle further includes a clutch capable of controlling power transmission between the engine and the motor generator. The standby control means incorporates standby pressure control means for controlling a clutch pressure such that the capacity of the torque transmitted by the clutch becomes a capacity that allows the engine to revolve to the cranking start position.

To achieve the third object, the starting control means incorporates cranking pressure control means for controlling the engagement pressure of the clutch such that the capacity of the torque transmitted by the clutch becomes less than or equal to an output torque from the motor generator subsequent to the standby control.

To achieve the fourth object, the hybrid drive apparatus for a vehicle further includes a starter motor for starting the engine. The starting control means causes the starter motor to start and the clutch to be brought to engagement simultaneously subsequent to the standby control.

To achieve the fifth object, there is provided a hybrid drive apparatus for a vehicle including an engine, a motor generator, a clutch capable of controlling power transmission between the engine and the motor generator; a transmission unit capable of transmitting the power of the engine and the motor generator to the wheels; and a control unit for controlling the engine, the motor generator and the clutch. The starting control means for engaging the clutch so as to start the engine when a vehicle is driven in a state where the engine is stopped, the clutch is disengaged to allow the motor generator to transmit its power to the wheels, and standby control means for performing control to bring the clutch to engagement to revolve the engine to a cranking start position prior to the start of the engine performed by the starting control means. The standby control means incorporates standby pressure control means for controlling the engagement pressure of the clutch such that the capacity of the torque transmitted by the clutch becomes a capacity that allows the engine to revolve to the cranking start position. The starting control means incorporates cranking pressure control means for controlling the engagement pressure of the clutch such that the capacity of the torque transmitted by the clutch becomes equal to or lower than an output torque from the motor generator subsequent to the standby control.

To achieve the sixth object, there is provided a hybrid drive apparatus for a vehicle including an engine, a motor generator, a starter motor for starting the engine, a clutch capable of controlling power transmission between the engine and the motor generator, a transmission unit capable of transmitting the power of the engine and the motor generator to wheels, and a control unit for controlling the engine, the motor generator, the starter motor and the clutch. The control unit incorporates starting control means for starting the engine when a vehicle is driven in a state where the engine is stopped, the clutch is disengaged and the power of the motor generator is transmitted to the wheels, and standby control means for performing control to bring the clutch to engagement to revolve the engine to a cranking start position prior to the start of the engine performed by the starting control means. The standby control means incorporates standby pressure control means for controlling the engagement pressure of the clutch such that the capacity of the torque transmitted by the clutch becomes a capacity that allows the engine to revolve to the cranking start position, and the starting control means starts the starter motor and brings the clutch to engagement simultaneously subsequent to the standby control.

To achieve the seventh object, the cranking pressure control means incorporates constant acceleration control means for controlling the engagement pressure of the clutch such that a rate of change in the revolutions of the engine is set to a required value.

To achieve the eighth object, the cranking pressure control means incorporates revolution maintaining and controlling means for controlling the engagement pressure of the clutch such that the rate of decrease in the revolutions of the motor generator becomes equal to or lower than a predetermined value.

To achieve the ninth object, the starting control means incorporates start-up control means for operating the starter motor only for a period of time in which the engine is slightly revolving.

To achieve the tenth object, the starting control means incorporates cranking pressure setting means for setting the engagement pressure of the clutch to a value with which the clutch transmits an average value of the cranking torque of the engine.

To achieve the eleventh object, the starting control means incorporates torque control means for causing the motor generator to produce an output of the average value of the cranking torque of the engine and an output of the torque for driving the vehicle.

To achieve the twelfth object, the starting control means incorporates torque control means for causing the motor generator to produce an output of the torque corresponding to a starting current for the starter motor.

To achieve the thirteenth object, a time for operating the starter motor is controlled by a timer.

To achieve the fourteenth object, the starting control means incorporates torque control means for causing the motor generator to output maximum torque and pressure increase means for increasing the engagement pressure to increase the torque capacity of the clutch when the motor generator produces an output of maximum torque.

To achieve the fifteenth object, the starting control means incorporates torque control means for causing the motor generator to output an average value of cranking torque of the engine.

To achieve the sixteenth object, the starting control means incorporates sweep-up means for sweeping up the engagement pressure of the clutch.

To achieve the seventeenth object, the standby control means incorporates fast-fill-pressure supply means for shortening a piston stroke of the clutch.

To achieve the eighteenth object, the control unit has a clutch standby region set between a motor drive region and an engine drive region.

To achieve the nineteenth object, the starting control means supplies fuel to the engine for ignition when the revolutions of the engine have reached a predetermined revolution.

To achieve the twentieth object, the starting control means brings the clutch to complete engagement subsequent to synchronization of revolutions of the engine and the motor generator.

To achieve the twenty-first object, the control unit incorporates completion control means for sweeping down the output torque from the motor generator and enlarging a throttle opening of the engine.

To achieve the twenty-second object, the standby control means incorporates fast-fill-pressure supply means for shortening the piston stroke of the clutch.

To achieve the twenty-third object, the control unit has a clutch standby region set between a motor drive region and an engine drive region.

To achieve the twenty-fourth object, the starting control means supplies fuel for ignition when the revolutions of the engine have reached a predetermined number of revolutions.

To achieve the twenty-fifth object, the starting control means brings the clutch to complete engagement subsequent to synchronization of the revolutions of the engine and the motor generator.

To achieve the twenty-sixth object, the control unit incorporates completion control means for sweeping down the output torque from the motor generator and for enlarging a throttle opening of the engine.

According to the invention, the hybrid drive apparatus for a vehicle is structured such that cranking of the engine is always started in a state where the engine is controlled to revolve to the cranking start position by the standby control means. Unlike the cranking performed at an indefinite position, the above-identified cranking can easily be controlled. Thus, the engine can stably be started within a predetermined period of substantially a short time. Therefore, the above-mentioned structure allows restart of the engine with satisfactory response while being driven by the motor generator. As a result, a great decrease in the driving torque generated at the restart of the engine can be prevented under the simple starting control.

Because the standby control is performed such that the engagement pressure of the clutch is controlled by the standby pressure control means to limit the torque capacity, the engine can reliably be revolved to the cranking start position using the motor generator torque.

Because the engine is cranked such that the engagement pressure of the clutch is controlled by the cranking pressure control means to limit the capacity of transmitted torque to a value equal to or smaller than the output torque of the motor generator, the engine can be cranked within the torque which can be produced.

As the starter motor is started by the starting control means simultaneously with the engagement of the clutch, the torque of the starter motor can effectively be used when a large torque is required at the start-up of the engine revolution in an initial stage of the cranking process.

At a standby state where the cranking characteristic is kept constant, cranking of the engine enables a start with the torque less than or equal to the output torque of the motor generator. Therefore, the motor generator is allowed to realize the standby state for cranking the engine and to start subsequent to the cranking operation without any particular auxiliary drive means.

When performing the start of the engine requiring great torque after the standby state for making the cranking characteristic constant has been realized, the starter motor provided for the engine is supplementarily used. Thus, the engine can be cranked while decreasing both of the load of the motor generator and that of the starter motor. Therefore, the aforementioned structure is able to restart the engine with satisfactory response without enlarging the motor generator for cranking.

Because the engagement pressure of the clutch is controlled such that the rate of change in the revolutions of the engine is kept constant in cranking the engine, the engine can be restarted by simply controlling the engagement pressure of the clutch.

The engagement pressure of the clutch is controlled such that a decrease in the number of revolutions of the motor generator falls within a predetermined range in cranking the engine. Therefore, starting control can be performed in accordance with a deceleration feeling based on the number of revolutions of the motor generator.

Because starting control is performed such that the starter motor is operated at a light load to compensate for the cranking torque generated by the motor generator for a limited period, durability of the starter motor is maintained while reducing both the load of the motor generator and the load of the starter motor at cranking.

As the starter motor is supplementarily used when revolution is started in an initial stage of cranking and the output torque from the motor generator is increased to assume an average value during the engine start period, control of the engagement pressure of the clutch for transmitting the torque can be simplified.

When revolution is started, the starter motor is supplementarily used and the output torque from the motor generator is increased to assume an average value during the engine start period, control of the output torque can be simplified while reducing the torque load of the motor generator for starting the engine.

The engine is started such that the starter motor is mainly used and the motor generator torque is supplementarily used. Therefore, control can be performed such that torque for cranking the motor generator is decreased, thus minimizing the influence on the driving torque. Moreover, durability of the starter motor is maintained.

The starter motor during starting control is simplified.

As the engine is cranked at a maximum torque which can be produced by the motor generator, the engine can be restarted with a satisfactory response only by the motor generator while preventing generation of a deceleration shock.

Because the engine can be cranked at a predetermined acceleration while causing the motor generator to produce an output of predetermined torque at the starting control, the control of the motor generator can be simplified.

According to the invention, the control of the engagement pressure of the clutch performed at a transition from the standby control to the starting control can be simplified.

Because the starting control by the motor generator can be performed so as to quickly complete the piston stroke of the clutch for the purpose of performing the standby control, the response of the standby control is improved.

As the start timing of the standby control can easily be determined in accordance with a determination of the region, the logic for the standby control can be simplified and the standby control can quickly be executed.

Because fuel is supplied to the engine for ignition at a timing when the number of revolutions of the engine has reached a predetermined value, the engine can appropriately be started.

According to the invention, the engine starting control by the motor generator can smoothly be completed.

According to the invention, transition from the motor drive to the engine drive can smoothly be performed subsequent to the start of the engine.

According to the invention, the starting control using the starter motor can be performed such that the piston stroke of the clutch for the standby control can quickly be executed, thus improving response of the standby control.

As the start timing of the standby control can easily be determined by determining the region at restarting by the starter motor, the standby control can quickly be executed while simplifying the logic thereof.

Because control is performed such that the fuel supply and ignition is performed at a timing when the number of revolutions thereof has reached a predetermined value at restarting using the starter motor, the engine can appropriately be started.

According to the invention, the engine starting control using the motor generator and the starter motor can smoothly be executed.

According to the invention, transition from the motor drive to the engine drive subsequent to the engine start by the motor generator and the starter motor can smoothly be executed, respectively.

Other objects, features and advantages of the invention will be evident from the following detailed description of the preferred embodiments described in conjunction with the attached drawings.

BRIEF DESCRIPTION OF THE DRAWINGS

The invention will be described in conjunction with the following drawings in which like features are designated with like reference characters, and wherein.

DESCRIPTION OF THE PREFERRED EMBODIMENT

Figure 1:
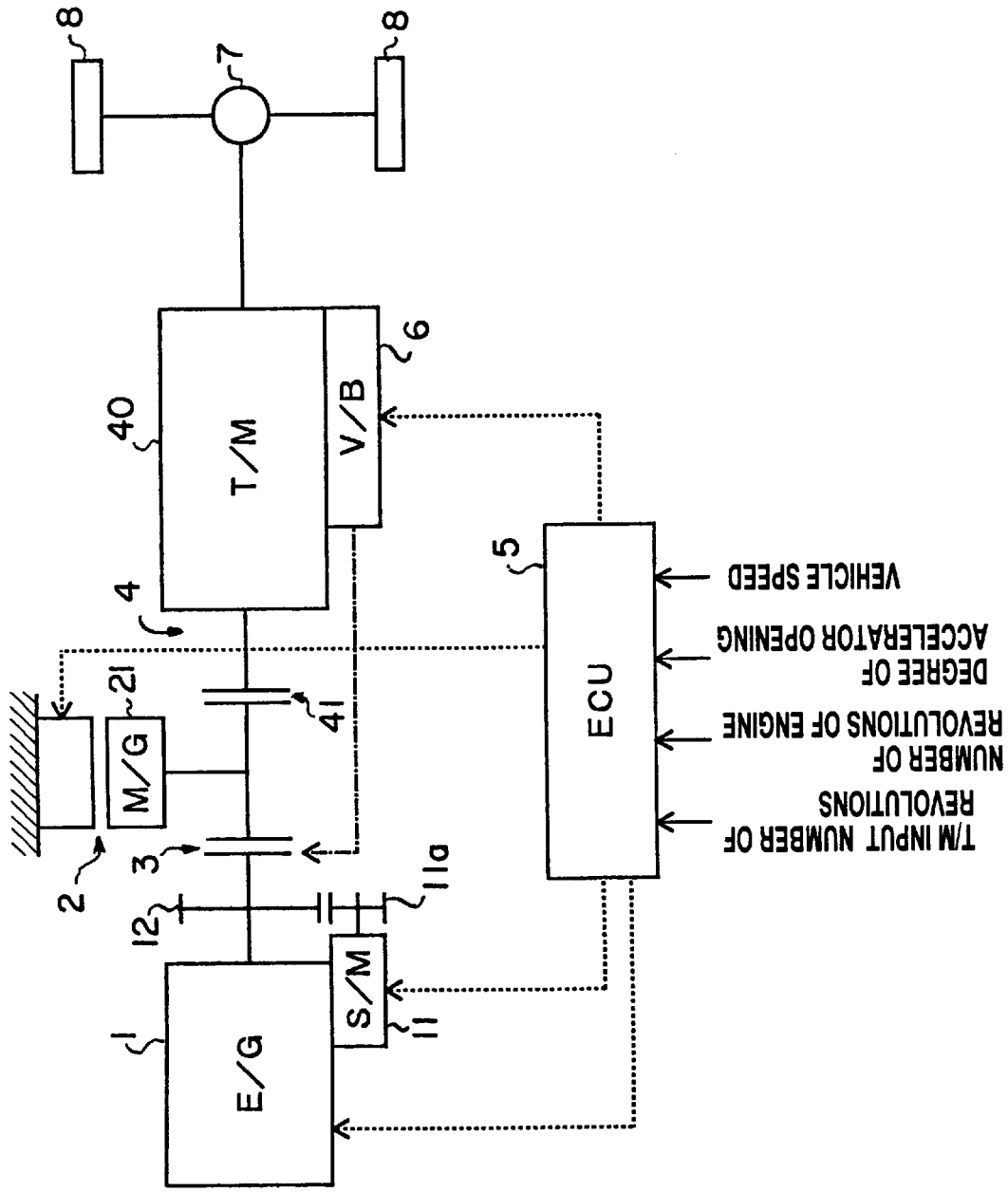
FIG. 1 is a diagram showing the system of a hybrid drive apparatus for a vehicle according to a first embodiment of the invention.

Embodiments of the invention will now be described with reference to the drawings. FIG. 1 is a diagram showing the structure of the system of a hybrid drive apparatus for a vehicle according to a first embodiment of the invention. The hybrid drive apparatus for a vehicle according to the first embodiment incorporates an engine (E/G) 1, a motor generator (M/G) 2, a clutch 3 which is capable of controlling power transmission between the engine 1 and the motor generator 2, a transmission unit 4 which is capable of transmitting power of the engine 1 and the motor generator 2 to the vehicle wheels and an electronic control unit (ECU) 5 for controlling the engine 1, the motor generator 2, a starter motor (S/M) 11 and the clutch 3.

The engine 1 incorporates an auxiliary machine as the starter motor 11 arranged to be operated by a 12 V low-voltage battery for auxiliary units. Like a generally-employed starter, an output gear 11a is revolved and engaged with a wheel gear 12 secured to a crank shaft of the engine 1 during revolution of the starter motor 11. When the revolution of the starter motor 11 has been interrupted, the output gear 11a is disengaged from the wheel gear 12.

The motor generator 2 has a rotor 21 connected to the engine 1 through the clutch (hereinafter called a "Ci clutch" so as to be distinguished from other clutches) 3. Moreover, the motor generator 2 is connected to an automatic transmission unit (T/M) 40, mainly constituting the transmission unit 4, through an input clutch (hereinafter called a "C1 clutch") 41.

The automatic transmission unit 40, constituting the transmission unit 4, incorporates a predetermined gear train controlled by a hydraulic control unit (V/B) 6. An output shaft of the automatic transmission unit 40 is connected to right and left driving wheels 8 through a differential unit 7. In the apparatus according to this embodiment, the hydraulic control unit 6 also serves as a control unit for controlling the hydraulic servo of the Ci clutch 3.

The control unit 5 constitutes an electronic control unit including a microcomputer for controlling the motor generator 2 through an inverter (not shown), the hydraulic control unit 6 through a solenoid (not shown) and the starter motor 11 through a relay. The control unit 5 is able to receive a signal indicating the degree of accelerator opening, a vehicle speed signal, a signal indicating the number of revolutions input to the transmission and a signal indicating the number of revolutions of the engine 1 from corresponding sensors (not shown).

The control unit 5 incorporates a starting control means. The starting control means detects the degree of accelerator opening so as to restart the engine 1 during running of the vehicle in a state where the engine 1 is stopped and the Ci clutch 3 is disengaged to transmit the power of the motor generator 2 to the driving wheels 8. The control unit 5 incorporates a standby control means for revolving the engine 1 to a position at which cranking is started prior to the process by the starting control means. Specifically, the starting control means incorporates the standby-pressure control means for controlling the engagement pressure of the Ci clutch 3 so as to adjust the power transmission.

Figure 2:
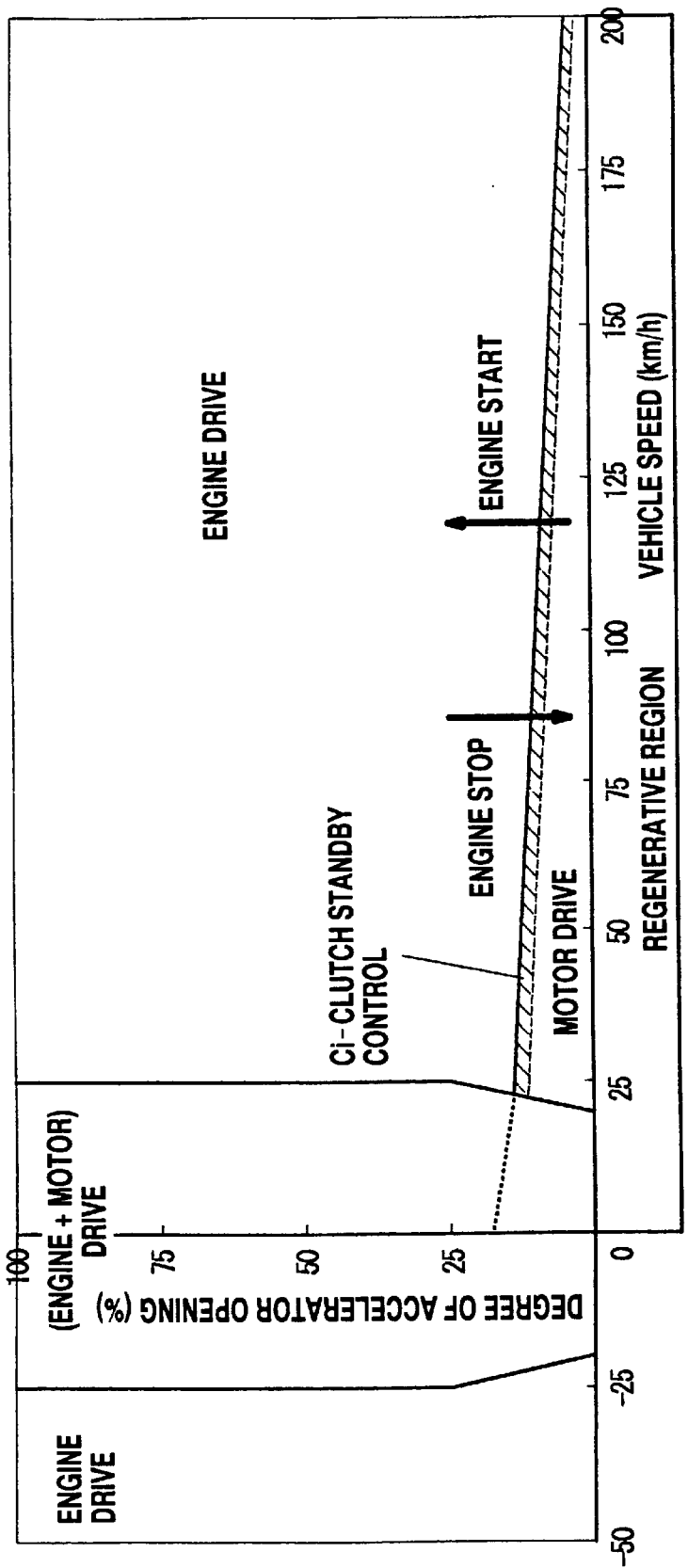
FIG. 2 is a drive mode map in a control unit of the hybrid drive apparatus for a vehicle.

Moreover, the control unit 5 has a drive mode map stored in the memory of the microcomputer thereof. FIG. 2 graphically shows the map data. In accordance with the relationship between the vehicle speed and the degree of accelerator opening, the following regions are provided; an engine drive region formed in a high negative speed (reverse drive) area when the accelerator has been turned on; engine and motor drive regions formed in a low positive speed area and a low negative speed (forward/reverse) area on the two sides of a position including the vehicle speed of zero; an engine drive region formed in a high positive speed (forward drive) area except for an area of a low degree of accelerator opening area; a motor drive region formed in the low degree of accelerator opening area; and a regenerative region formed in a positive vehicle speed region (forward movement to drive the wheel) when the accelerator is turned off. A Ci clutch standby control region to be described later, is formed in the motor drive region adjacent to the engine drive region.

A process for determining whether the engine 1 is stopped is made when the control unit 5 determines that the engine 1 may be stopped in accordance with the drive mode map shown in FIG. 2 in a case where the degree of accelerator opening is in the motor drive region for a time not shorter than a predetermined time. When the control unit 5 determines that start of the engine 1 is required in a case where the degree of accelerator opening is, conversely to the above-mentioned determination to stop the engine 1, in the engine drive region for a time not shorter than a predetermined time, it is determined that the engine 1 has been restarted. When it is determined that the engine 1 should be restarted, standby control of the Ci clutch 3 and starting control of the engine 1 are performed. Then, it is determined that combustion has been completed and completion control is performed. The starting control of the engine 1 is composed of control of the start of the revolutions of the engine which is performed in the former half portion of a cranking process, control of acceleration which is performed in the latter half portion of the cranking process, fuel supply and ignition. The standby control of the Ci clutch 3 can be performed at the following three moments in time. A first moment in time is a moment when the determination to restart has been made. A second moment in time is a moment when the Ci clutch standby control region in the drive mode map shown in FIG. 2 has been started. A third moment in time is a moment in time included in a predetermined period of time after the engine stop control has been completed. A method using the above-mentioned second timing is the most effective method. In this embodiment, the above-mentioned methods are used inclusively.

Figure 3:
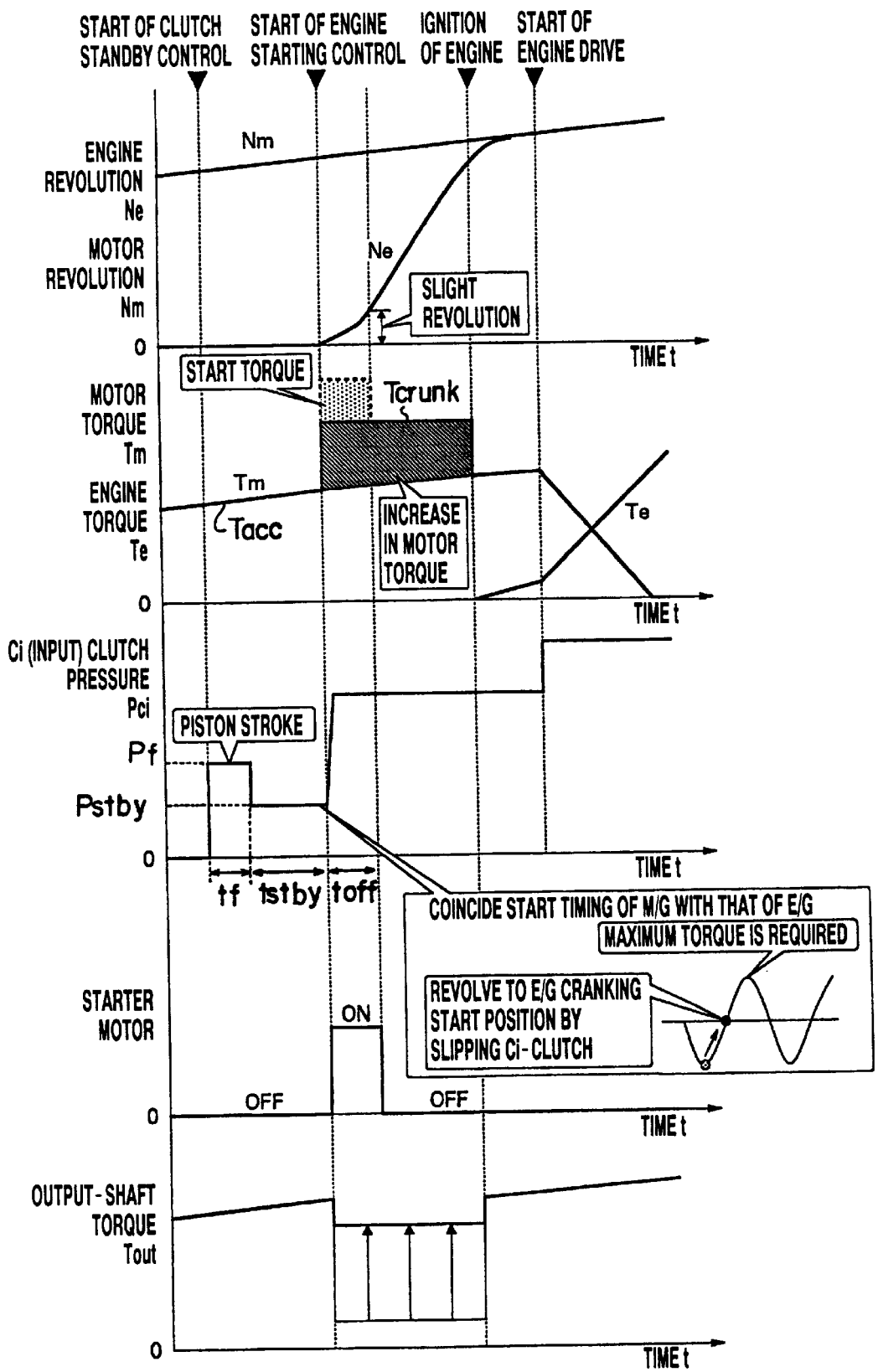
FIG. 3 is a timing chart for a process for starting the engine executed by the control unit.

Referring to the timing chart shown in FIG. 3 and also referring to FIG. 1, the contents of the control will sequentially be described. At first, the engine revolution (Ne) assumes a value of zero indicating the stop state, the motor revolution (Nm) is gradually increased as the vehicle speed increases, the engine torque (Te) assumes a value of zero indicating the stop state, the motor torque (Tm) is gradually increased in an accelerated state with the torque output in accordance with an output control map determined previously in accordance with the degree of accelerator opening, the Ci clutch pressure (Pci) assumes a value of zero indicating the disengaged state and the output-shaft torque (Tout) is in a state where it is gradually increased to correspond to the driving force realized by the motor torque.

When the degree of accelerator opening in the motor drive region is increased to enter into the Ci clutch standby control region, a solenoid signal is transmitted (as indicated with a dashed line shown in FIG. 1) from the control unit 5 to the hydraulic control unit 6. Thus, control is performed such that the Ci clutch pressure (Pci) is, as fast-fill pressure (Pf), supplied to the hydraulic servo of the Ci clutch 3 for a fast-fill period of time (tf) (as indicated by a chain line shown in FIG. 1). The fast-fill pressure (Pf) and the fast-fill period of time (tf) are determined to be a value by which the clutch piston can quickly be stroked and the cylinder of the hydraulic servo of the Ci clutch 3 can be filled with oil.

Then, a similar procedure is employed such that the standby pressure (Pstby) is applied for a standby period of time (tstby). The standby pressure (Pstby) represents a pressure level (for example, about 100 kPa to about 200 kPa) at which the Ci clutch 3 is able to transmit small torque so as to slightly revolve the crank shaft of the engine 1 and at which the crank shaft is stopped at an angular position corresponding to the compressive torque immediately before the position corresponding to the required compressive torque. The standby period of time (tstby) must be, for example, about several hundreds of msec. when employing the first or the third determination methods. If the first determination method is employed, sweep-up control is immediately started. If the third determination method is employed, the Ci clutch 3 is turned off. Then, a motor drive mode is started. If the second determination method is employed, the standby period of time (tstby) is continued until the next control (sweep-up control) of the pressure of the Ci clutch 3 is performed.

When the Ci clutch standby control has been performed as described above, the torque of the motor generator 2 is transmitted to the engine 1 through the Ci clutch 3. Thus, the engine 1 is revolved. Since the required torque is increased at the start of compression stroke of the first cylinder, the Ci clutch 3 is slipped. Thus, the engine 1 is stopped at the position corresponding to the present crank angle so that the engine 1 is brought to the standby state prior to the cranking operation. The rotational angle for the engine 1 is not larger than about 100° in a case of a six-cylinder engine. In the above-mentioned period of time, a portion of the motor torque (Tm) is used to revolve the engine 1 to the cranking start position. Since low revolution resistance is, however, generated, a great influence is not exerted to the output-shaft torque (Tout). Since the crank angle position is always brought to be positioned before the position at which the cranking torque is generated as described above, the same rise characteristic of the cranking torque can be realized when the control is started. As a result, the sweep-up response of the Ci clutch pressure during the engine starting control can be improved.

After the lapse of the standby period of time (tstby) in which the standby state is realized, engine start is performed by the starting control means. In this case, the motor torque (Tm) and the Ci clutch pressure (Pci) are increased and the starter motor 11 is started simultaneously. As a result, the motor torque (Tm) is increased such that the increased torque (Tcrunk) and the starting torque are added to the previous torque (Tacc) required to drive the vehicle and corresponding to the degree of accelerator opening. The torque is transmitted through the clutch, the torque transmission capacity of which has been increased in conjunction with the rise in the Ci clutch pressure (Pci), thus cranking the engine 1. As a result, the engine 1 starts revolving while exceeding the peak torque realized by inertia torque generated at the rise of the revolutions of the engine 1. Although the rise of the revolutions can be determined by detecting the engine revolution (Ne), it is determined whether off-time (toff) of the starter motor has elapsed because the small number of revolutions cannot accurately be detected. If the off-time (toff) has elapsed, the starter is turned off. The state where the motor torque is increased is maintained. When the number of revolutions of the engine 1 has been increased to a predetermined number of revolutions in this case, ignition timing is adjusted. Simultaneously with the ignition, the motor torque (Tm) is returned to the torque value required to drive the vehicle.

The determination with respect to completion of combustion for confirming the start of the engine (in a state where the engine is allowed to revolve continuously) can be performed by the method described below. A first method uses the output of an $O_2$ sensor provided in the exhausting portion so as to be used to perform general control of the air-fuel ratio. With this method, the concentration of oxygen in the exhaust gas is reduced considerably if the combustion stroke in the cylinder is controlled to be continuously performed. Therefore it can be determined that the combustion has been completed. A second method used is to detect the temperature of the exhaust gas or the temperature of a catalytic converter for processing the exhaust gas. A third method used is to detect the combustion pressure in the cylinder. The first method is the most effective from among the above-mentioned methods. If an $O_2$ sensor provided with a heater is employed so as to stabilize the performance (the sensitivity) of the sensor even if the temperature of the exhaust gas is low, an even better result can be obtained. Since the third method employs a sensor provided only for a lean-burn engine, the sensor is operated only for determining completion of the combustion. Therefore, the third method is disadvantageous in terms of cost reduction.

When completion of the combustion of the engine 1 has been determined, an electromagnetic control throttle valve is opened to a degree corresponding to the accelerator opening on the respective occasions. Thus, the number of revolutions of the engine 1 is approximated to the input number of revolutions to the transmission operated by the motor with the output torque corresponding to the degree of opening of the accelerator. When the engagement of the Ci clutch 3 has been completed (when the number of revolutions of the engine 1 and the input number of revolutions to the transmission are identical), the motor output torque (Tm) is swept down at a predetermined gradient corresponding to the degree of accelerator opening.

Figure 4:
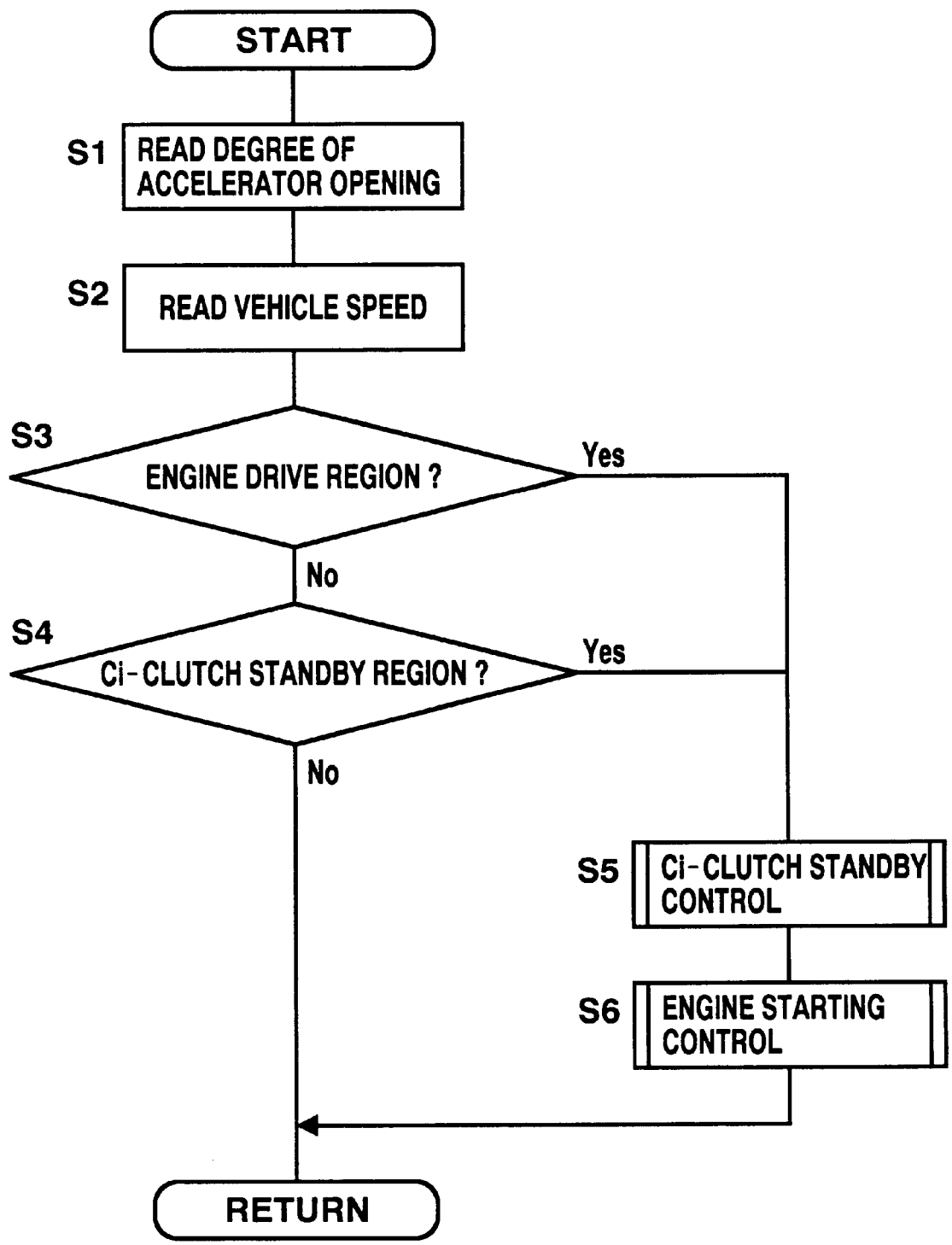
FIG. 4 is a main flow chart of the process for starting the engine.

A specific procedure for performing the above-mentioned control will now be described with reference to a flow chart. FIG. 4 shows a main flow for controlling the start of the engine during the running of the vehicle. The degree of accelerator opening is read in step S1 and the vehicle speed is read in step S2. Thus, in step S3, it is determined whether the present state of driving is in the engine drive region based on the drive map (see FIG. 2). In step S4, it is determined whether the present state of driving is in the Ci clutch 3 standby region based on the drive map. If the determination in either of step S3 or step S4 is (Yes), the Ci clutch standby control is executed in step S5. In step S6, the engine starting control is executed.

Figure 5:
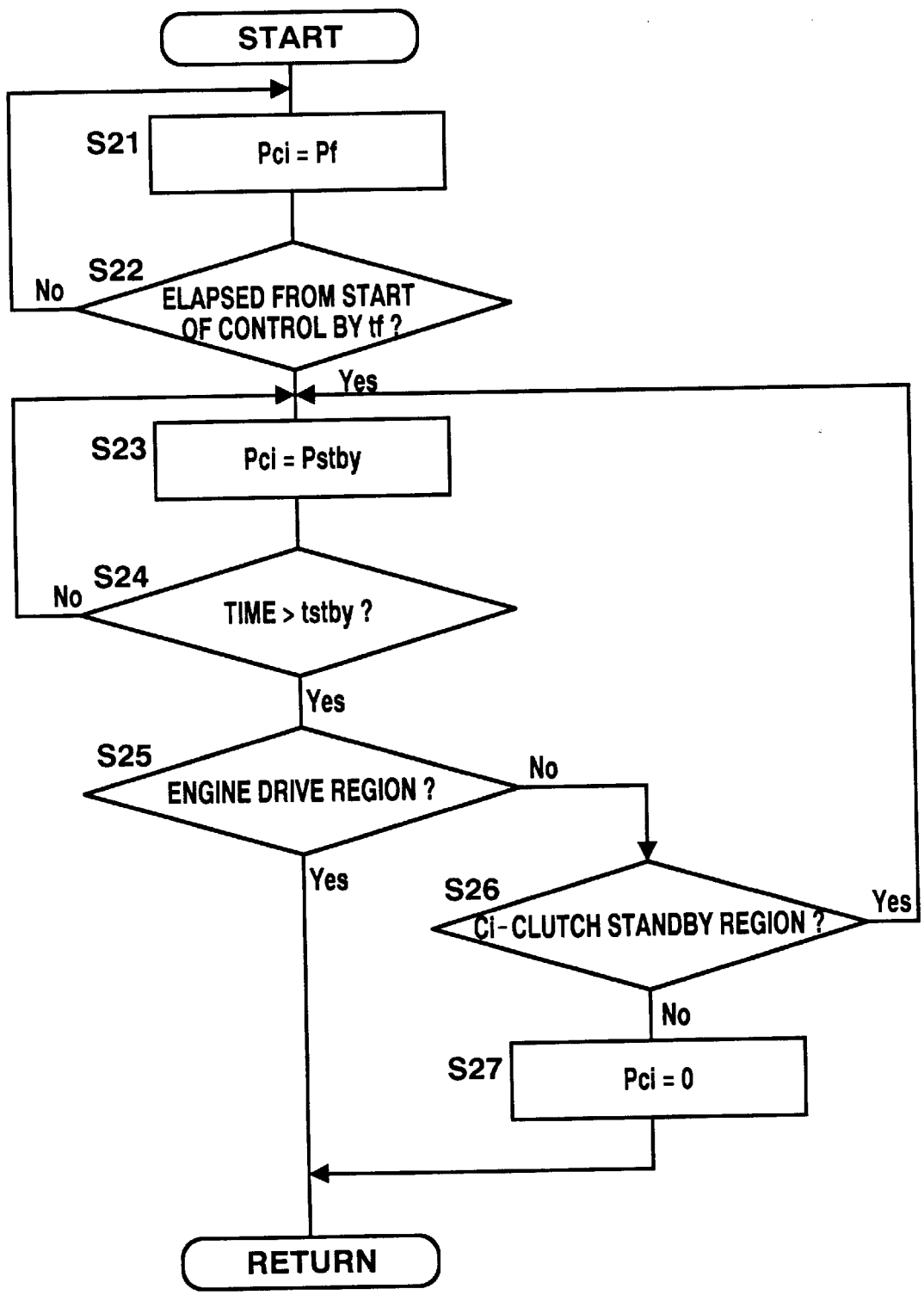
FIG. 5 is a flow chart of a sub-routine in the main flow chart for the standby control.

FIG. 5 shows a sub-routine for the Ci clutch standby control which is executed in step S5 as shown in FIG. 4. In the foregoing routine, the Ci clutch pressure (Pci) is set to an initial value (Pf) for outputting in step S21. Thus, a process for shortening the piston stroke of the clutch is performed. The operation of the Ci clutch operated by the above-mentioned process can be confirmed if the time (tf) has elapsed from output of the hydraulic pressure in accordance with a timer in step S22.

After the foregoing time has elapsed, the Ci clutch pressure (Pci) is set to the predetermined standby pressure (Pstby) to bring the engine to the cranking start position in step S23. Then, the standby pressure (Pstby) is output. As a result, the crank shaft of the engine is slightly revolved so that the engine is brought to the cranking start position (prior to the compression stroke). The cranking start position is confirmed in step S24 by determining whether the predetermined standby period of time (tstby) has elapsed from the output of the standby pressure (Pstby). In step S25, it is determined whether the engine drive region has been started. If the above-mentioned determination is (Yes), the engine starting control sub-routine is started. If the determination of the engine drive region is (No) in step S25, it is determined in step S26 whether the state is in the Ci clutch standby region. If the foregoing determination is (Yes), the operation is returned to step S23 so that the Ci clutch pressure (Pci) is maintained at the standby pressure (Pstby). If the determination of the Ci clutch standby region is (No) in step S26, it is determined that the state has been returned to the motor drive region. Thus, the above-mentioned control is interrupted by executing a process for setting the Ci clutch pressure (Pci) to zero in step S27.

The start of the engine is controlled by two methods after the above-mentioned standby state has been realized. As a first embodiment, control using the starter motor will now be described.

Figure 6:
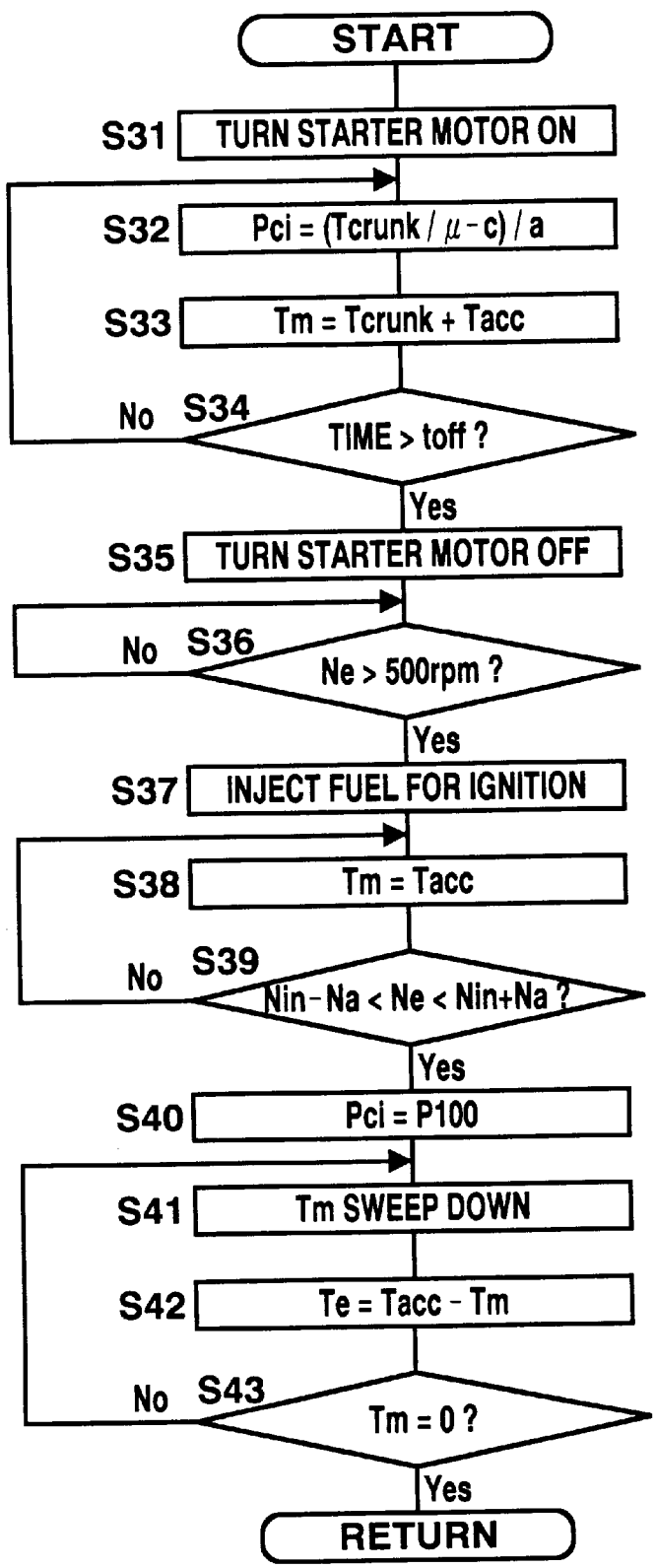
FIG. 6 is a flow chart of a sub-routine in the main flow chart for controlling the start of the engine.

In the first embodiment, steps S31 to S33 are simultaneously executed at the start of the engine starting control sub-routine as shown in FIG. 6. To describe the chart for easy comprehension, the steps are expressed sequentially. In step S31, the starter motor is started. In step S32, the Ci clutch pressure (Pci) is set to establish Pci=(Tcrunk/m−c)/a where Tcrunk is an average value of cranking, i.e., required starting, torque of the engine, which has been previously determined for the engine; m is a coefficient of friction of a friction member of the clutch; and a and c are constants determined based on the clutch.

In step S33, an output of the motor torque (Tm) is produced. The motor torque is set to establish Tm=Tcrunk+ Tacc, where Tcrunk is the torque required to start the engine and Tacc is the torque corresponding to the degree of accelerator opening and required to drive the vehicle. After the foregoing steps have been executed as described above, in step S34, it is determined whether off-time (toff) has elapsed from the start of the control. The foregoing time is a very short period, allowing the engine to revolve (one revolution) slightly. If an elapse of the off-time (toff) is confirmed, the starter motor is turned off (OFF) in step S35. Since the starter is operated for a very short time (toff) in the above-mentioned case, no problem arises in terms of durability of the starter and noise generated from the start of the starter. Steps S31 to S35 described above constitute the control of the start-up of the engine revolution.

In step S36, it is determined whether the revolution of the engine has reached a predetermined number of revolutions (for example, 500 rpm, that is, the number of revolutions at which the complete combustion state is reached where the engine is able to revolve by the supply of fuel and ignition). If the determination in step S36 is (Yes), the fuel is injected to the engine in step S37 so that ignition is performed and, thus, the engine is started. The above steps S32 to S36 constitute the control of the acceleration of the engine revolution.

After the engine has been started, the motor torque (Tm) is returned to the torque (Tacc) corresponding to the degree of accelerator opening in step S38. The foregoing process is performed because the cranking torque (Tcrunk) is not required after starting the engine. In step S39, it is determined whether the engine revolution (Ne) has been synchronized with the input number of revolutions (Nin) of the transmission within a range of ±Na. If the synchronization is determined (Yes), the Ci clutch pressure (Pci) is, in step S40, set to 100% pressure, that is, P100. Thus, the Ci clutch is engaged completely and the torque of the engine can be transmitted to the wheels. Therefore, a process for reducing the motor torque (Tm) is executed in step S41. Simultaneously, an output of the torque (Te=Tacc−Tm) decreases owing to sweep-down of the motor torque (Tm). Specifically, a signal is transmitted to the electronic throttle so as to open the throttle. Finally, in step S43, it is determined whether the motor torque (Tm) has been set to zero. If the foregoing determination is Yes, switching from the motor drive to the engine drive is completed. The aforementioned steps S38 to S43 constitute the part of completing the control.

The first embodiment eliminates a need for the motor generator to evaluate the performance for outputting the cranking torque in addition to the performance for driving the vehicle. Therefore, the size of the motor generator can be reduced. Since the general mass-produced starter motor for revolving the engine may commonly be employed, enlargement of the cost can be minimized. Furthermore, if the state of charge (SOC) of a high-voltage system (a power source for operating the motor generator) has been set to 0% owing to self-discharge, or the like, caused from an unused state for an extended period, an advantage can be realized in that the engine can be started by the 12 V battery for the auxiliary units as the generally-employed engine drive vehicle. Also, a jump start using a booster cable can be performed. Moreover, start of the engine at very low temperatures (−30° C. to −40° C.) can be performed with the response similar to a generally-employed vehicle irrespective of the performance of the electric oil pump at low temperatures.

Figure 7:
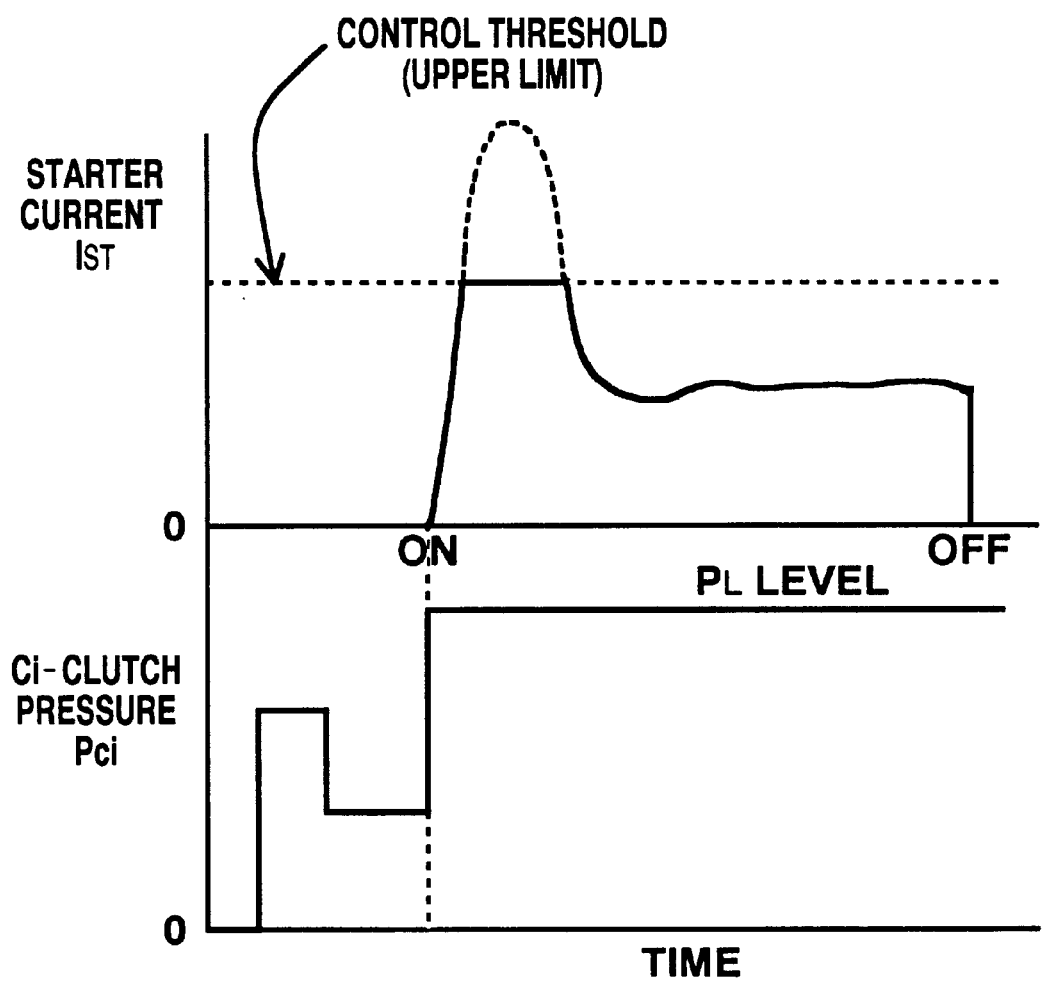
FIG. 7 is a timing chart showing a modification of the starting control according to the first embodiment.

The first embodiment is structured such that the motor generator 2 is mainly operated and the starter motor 11 is supplementarily operated. Another structure, conversely, may be employed in which the starter motor 11 is operated mainly and the motor generator 2 is operated supplementarily. In this case, a current sensor for measuring a current value which rushes into the starter motor is provided for the circuit for operating the starter motor. An output value from the current sensor is used to perform feedback control of the output torque from the motor generator when the starting control is performed. FIG. 7 shows a timing chart of the aforementioned control. In the control, the output torque from the motor generator is adjusted such that the current (1st) for operating the starter motor does not exceed a predetermined value. The clutch pressure (Pci) is required to be simply controlled such that the pressure is swept up to line pressure (PL) simultaneously with the start of the starter motor after which it is kept constant. The operation of the starter motor is interrupted when the engine revolution has increased to a predetermined number of revolutions.

When the above-mentioned control is performed, the operation load of the starter motor 11 can be decreased to a value equal to or smaller than a predetermined threshold value as indicated by a solid line shown in FIG. 7. The cranking load corresponding to the peak indicated by a dashed line shown in FIG. 7 is provided by the motor generator 2.

Figure 8:
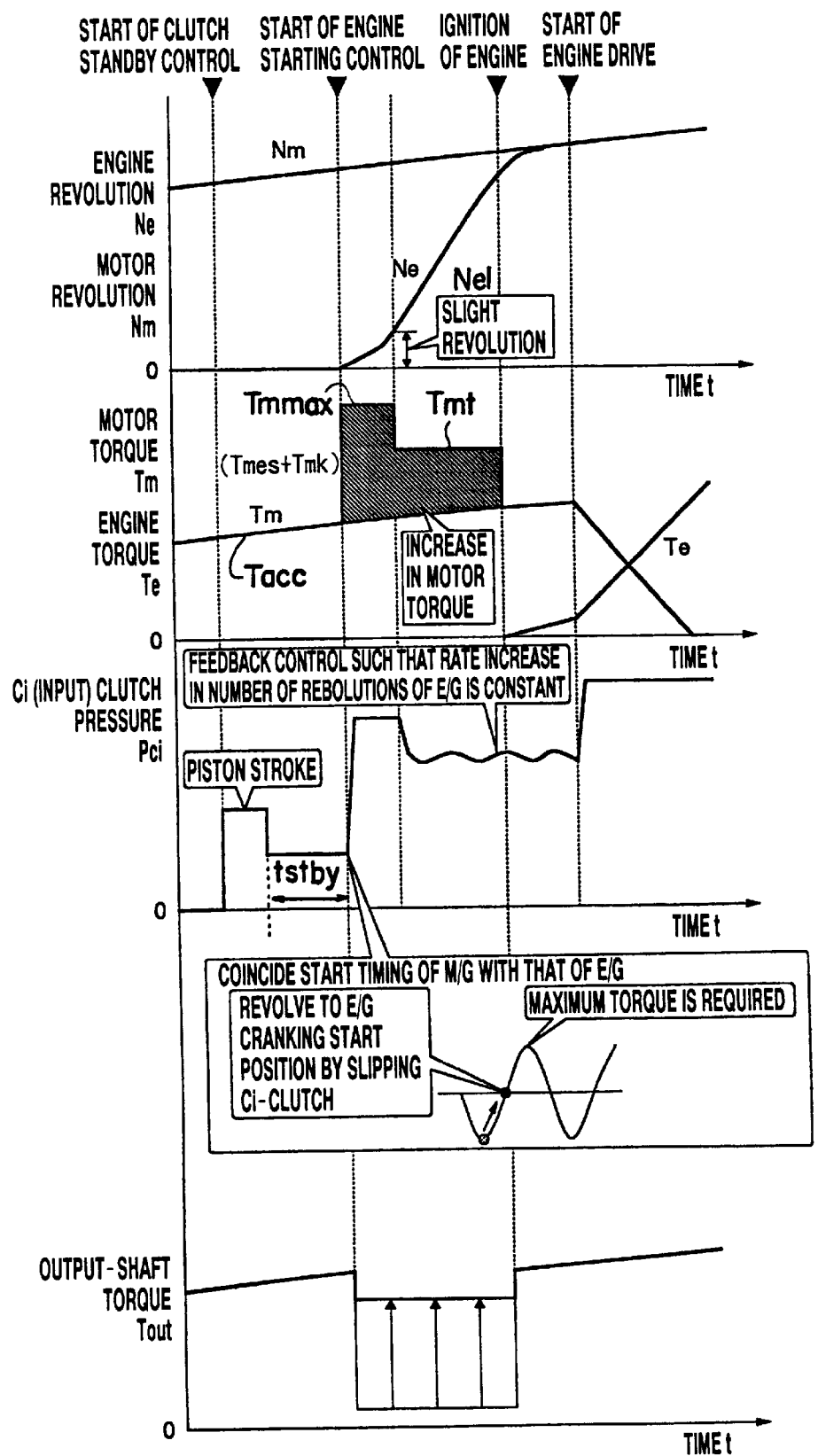
FIG. 8 is a timing chart for a process for starting the engine by the hybrid drive apparatus for a vehicle according to the second embodiment.

The first embodiment has the structure in which cranking of the engine 1 is mainly performed by the motor generator 2. Moreover the starter motor 11 is supplementarily operated when the revolution of the engine 1 is started. However, cranking of the engine 1 including start-up thereof can be performed only by the motor generator 2 without operating the starter motor 11. A second embodiment having the aforementioned structure will now be described referring to a timing chart shown in FIG. 8.

Also in the second embodiment, the process from the initial state to the standby control is performed in a manner similar to that of the first embodiment. Therefore, where the process is the same, it is omitted from the description. After the lapse of the standby period of time (tstby) in which the standby state is realized, the starting control means starts the engine. Unlike the first embodiment, the increase in the motor torque (Tm) to a maximum value (Tmmax) and raising of the Ci clutch pressure (Pci) are performed simultaneously. As a result, the motor torque (Tm) is obtained by adding the increased torque to the previous torque (Tacc) corresponding to the degree of accelerator opening required to drive the vehicle. Since the torque is transmitted through the Ci clutch 3, the torque transmission capacity of which has been increased owing to the rise in the Ci clutch pressure (Pci), cranking of the engine 1 is performed. As a result, the engine 1 starts revolving while exceeding peak torque realized by the inertia torque generated at the rise time of the revolution of the engine 1. The start of the revolution (slight revolution) is determined by a timer or the engine revolution (Ne). Then, the motor torque (Tm) is decreased to the torque (Tmt) which is capable of increasing the number of revolutions of the engine at a predetermined rate of change, while maintaining the state of increase. Also in this case, the ignition timing is determined when the number of revolutions of the engine 1 has been increased to a predetermined number of revolutions. Simultaneously with the ignition, the motor torque (Tm) is returned to the torque (Tacc) required to drive the vehicle. Subsequent control is executed in a similar manner to that of the first embodiment.

When starting the engine only by the motor generator 2, change (decrease) in the torque (Tout) for driving the vehicle upon start of the engine corresponds to the capacity of the torque which can be transmitted by the Ci clutch 3. Therefore, the capacity of the torque which can be transmitted by the Ci clutch 3 is controlled with the engagement pressure. In consideration of the combination of the reduction in the drive torque and the time for which the reduction is continued, a shock is reduced by an allowable level felt by the body of the passenger on-board within a range of the torque output performance of the motor generator 2. Thus, generation of uncomfortable deceleration feeling can be prevented.

As an initial (a starting control) region (Ne=0 to Ne1, a predetermined small number of revolutions) for controlling the start of the engine requires the largest start torque in this case, the output of the torque from the motor is set to the maximum value (Tmmax) for the aforementioned period of time. The foregoing value varies depending on various conditions including the vehicle speed, temperature of the battery, SOC and the like. Simultaneously with the torque control, an output of the Ci clutch pressure (Pci) is produced in the manner as described below. It is assumed that the torque used to start the engine (to start revolutions) is Tmes:

Tmes=Tci (capacity of torque transmitted by the Ci clutch)=(aPci+c)m where a and c are constants determined by the specifications of the clutch, m is a coefficient of friction of the friction member of the clutch and PCi is an engagement pressure of the Ci clutch. Note that m is calculated in accordance with the slipping speed of the friction member, the pressure applied to the pressing surface and the oil temperature as is known by those skilled in the art.

The ratio of the torque (Tmes) to start the engine with respect to the torque (Tmk) to drive the vehicle is determined in accordance with a result of an evaluation of feeling on an actual vehicle. If the torque (Tmes) to start the engine is decreased in a range of the maximum torque (Tmmax), an output of which can be produced, time for the initial control of the start of the engine (the starting control) region (Ne=0 to Ne1) is elongated. In this case, the engine start response deteriorates. Conversely if the torque (Tmes) is increased, insufficient driving torque causes the passenger on board to feel a great shock at starting. The aforementioned control is continued until the number of revolutions of the engine reaches a predetermined small number of revolutions (Ne1).

In a region where the number of revolutions is small until it reaches the small number of revolutions (Ne1), a low-cost sensor, such as an electromagnetic pickup sensor, cannot accurately detect the engine revolutions (Ne). Therefore, the foregoing control may be performed in accordance with an output from a sensor for detecting the intake air amount of the engine in place of the engine revolution (Ne).

After the aforementioned control has been performed, the constant acceleration control is performed. The foregoing control is performed such that the engagement pressure of the Ci clutch is feedback-controlled so that the number of revolutions of the engine is increased at a predetermined acceleration. When the engine revolution (Ne) has been increased to the number of slight revolutions (Ne1), the output from the motor is decreased to the torque (Tmt) for constantly accelerating the engine. The foregoing torque can be determined in accordance with the engine oil temperature (Teoil) and the engine revolution (Ne). The aforementioned relationship can be obtained as the value of the experimental result. In the aforementioned condition of the output from the motor, the output of the Ci clutch engagement pressure (Pic) is feedback-controlled such that the increase rate (dNe/dt) is set to a predetermined value.

After the engine revolution (Ne) has reached the synchronizing number of revolutions (Nin, an appropriate value ranging from about 500 rpm to about 700 rpm), the control of the engine for injecting fuel and ignition is started in the similar manner to the foregoing method. Then, the completion control is finally started. In the aforementioned control, the driving source is switched from the motor drive to the engine drive. At this time, a timer is set to an appropriate time after confirming the synchronization. In order to perform reliable synchronization, the continuously synchronized state is maintained, and then the engagement pressure of the Ci clutch is raised to the pressure corresponding to a duty ratio of 100%.

Figure 9:
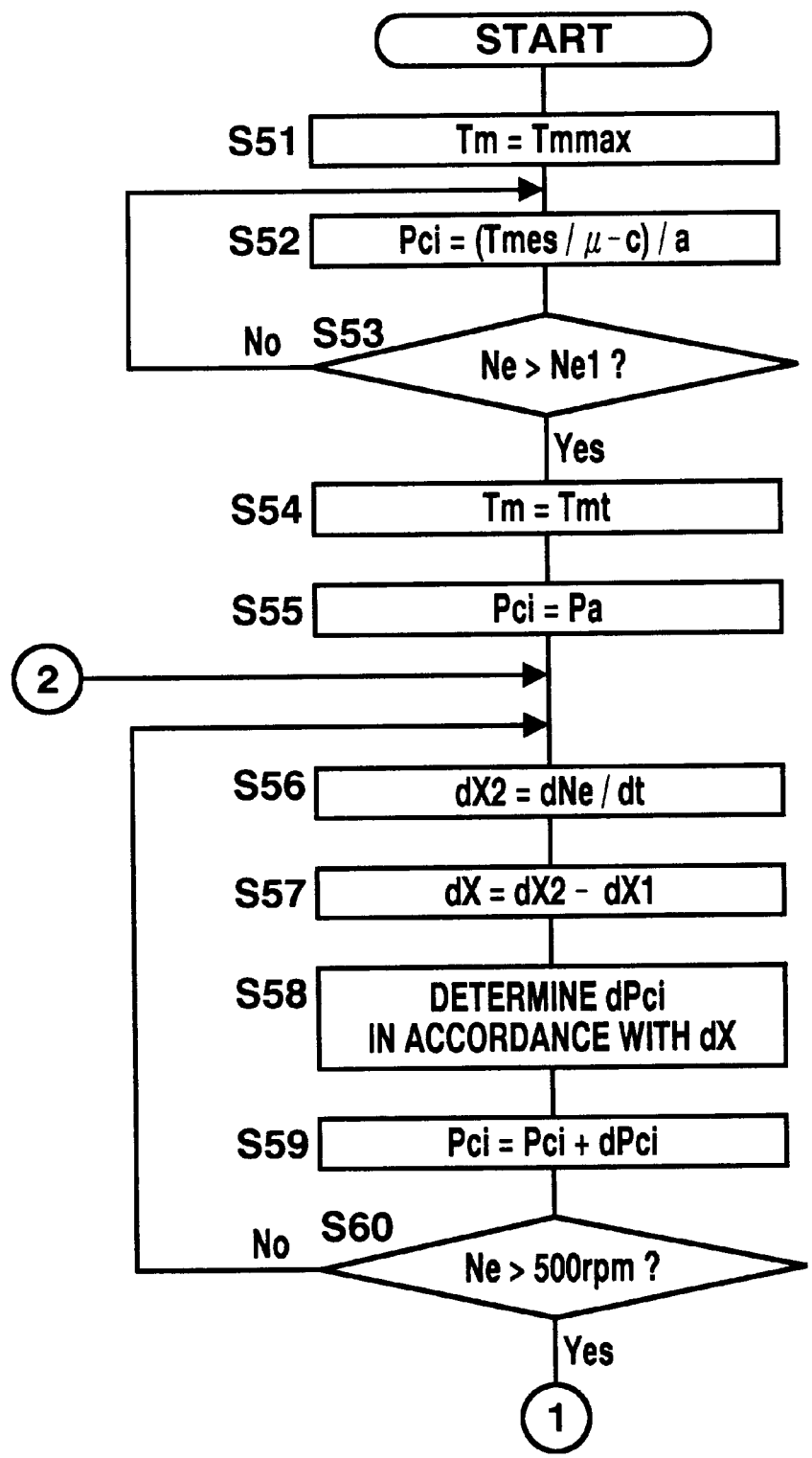
FIG. 9 is a flow chart of a part of the sub-routine for engine starting control to start the engine.
Figure 10:
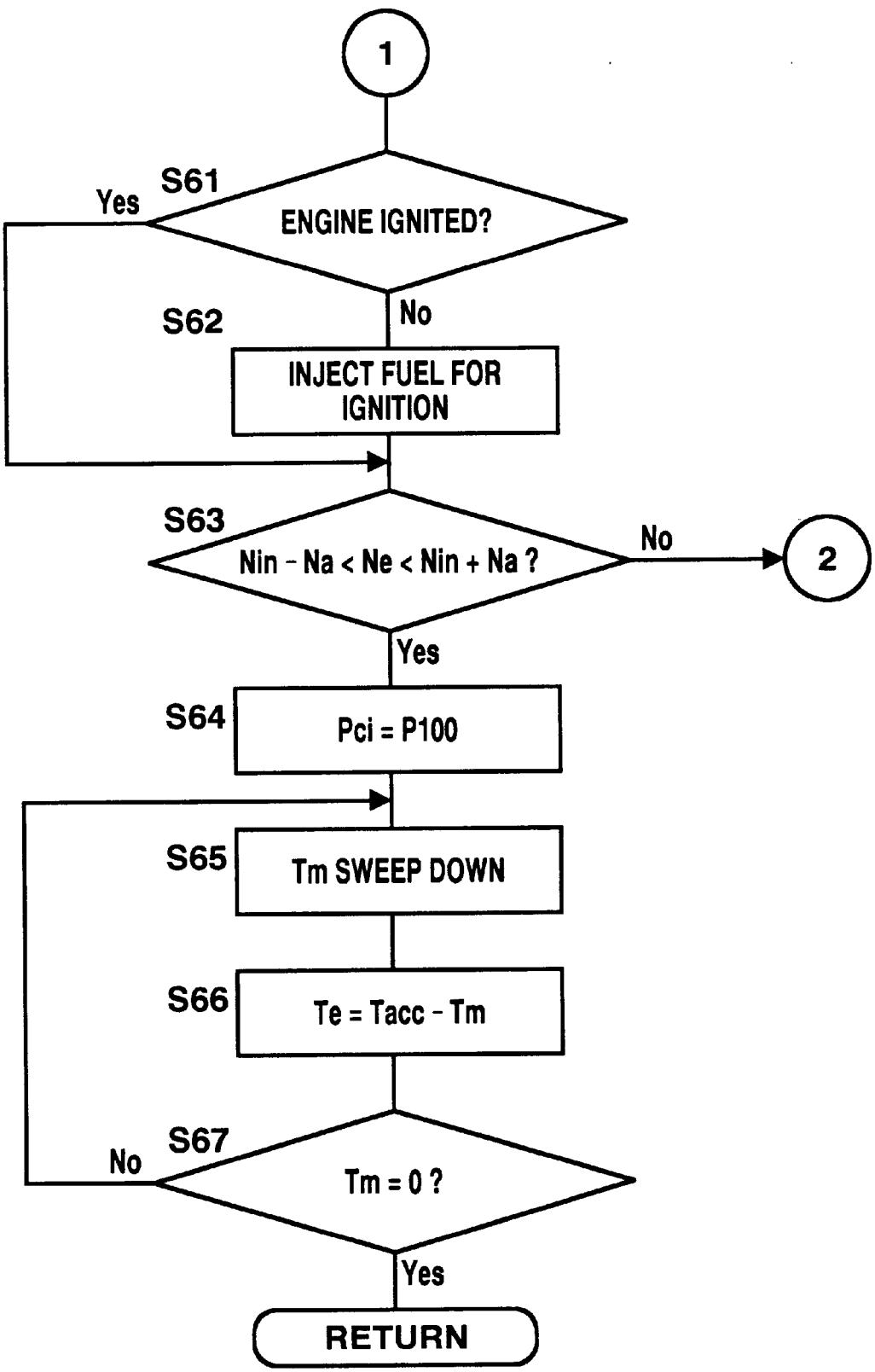
FIG. 10 is a flow chart showing the other part of the sub-routine for the engine starting control.

A sub-routine for controlling the start of the engine according to the second embodiment is performed in accordance with a flow chart shown in FIGS. 9 and 10. In step S51, the motor torque (Tm) is set to the maximum torque (Tmmax), the output of which can be performed by the motor generator in the present condition. The maximum torque (Tmmax) is the torque with which output of both of the torque (Tmes) for starting the engine and the torque (Tmk) for driving the vehicle can be produced. The maximum torque (Tmmax) may be changed in accordance with the vehicle speed, the SOC of the battery or the temperature of the battery. Simultaneously, in step S52, the Ci clutch pressure (Pci) is determined to establish Pci=((Tmes/m)−c)/a. That is, the Ci clutch pressure (Pci) is determined to be a value that allows the Ci clutch pressure (Pci) to be transmitted by the starting torque (Tmes).

In step S53, it is determined whether the engine revolution (Ne) is larger than the predetermined small number of revolutions (Ne1). The foregoing determination may be performed in accordance with the time measured by the timer in place of the number of revolutions. In step S54, the motor torque (Tm) is decreased to the torque (Tmt) with which the number of revolutions of the engine can be increased at a predetermined rate of change. In step S55, the Ci clutch pressure (Pci) is set to a feedback initial value (Pa). In step S56, the present rate of change (dX2) in the number of revolutions of the engine is obtained. In step S57, a deviation (dX) from a required rate of change (dX1) is obtained. In step S58, changing pressure (dPci) is obtained in accordance with the obtained deviation (dX). The foregoing value is determined such that when the deviation (dX) is large in the direction of the positive values, the Ci clutch pressure (Pci) is decreased. When the deviation (dX) is large in the direction of the negative values, the Ci clutch pressure (Pci) is increased. Thus, the actual feedback control is executed in step S59.

In step S60, it is determined whether the engine revolutions (Ne) has exceeded a predetermined number of revolutions (for example, 500 rpm). The process returns to step S56 for executing the feedback control until the foregoing determination is made. If it is determined in step S60 that the number of revolutions of the engine has reached the predetermined number of revolutions, the process proceeds to step S61. In step S61, it is determined whether the state is in a combustion completed state where ignition has occurred for the engine. The aforementioned determination can be executed in accordance with an output from the $O_2$ (oxygen) sensor provided for the exhaust portion of the engine to control the air-fuel ratio as described above. When the combustion in the cylinder is sequentially performed in all cylinders and thus the concentration of oxygen in the exhaust gas is considerably lowered, the aforementioned determination can be executed. Since the aforementioned determination is (No) in a first loop, the program proceeds to step S62 where fuel is injected for ignition into the engine.

The following processes in steps S63 to S67 are substantially identical to those in steps S39 to S43 according to the first embodiment. Therefore, the similar processes are not again described.

According to the second embodiment, the engine can be restarted with a substantially quick response under the simple control without using the starter motor 11. Therefore, the aforementioned control is able to realize an advantage in that the foregoing control can be applied to a hybrid drive apparatus that has no starter motor 11.

Figure 11:
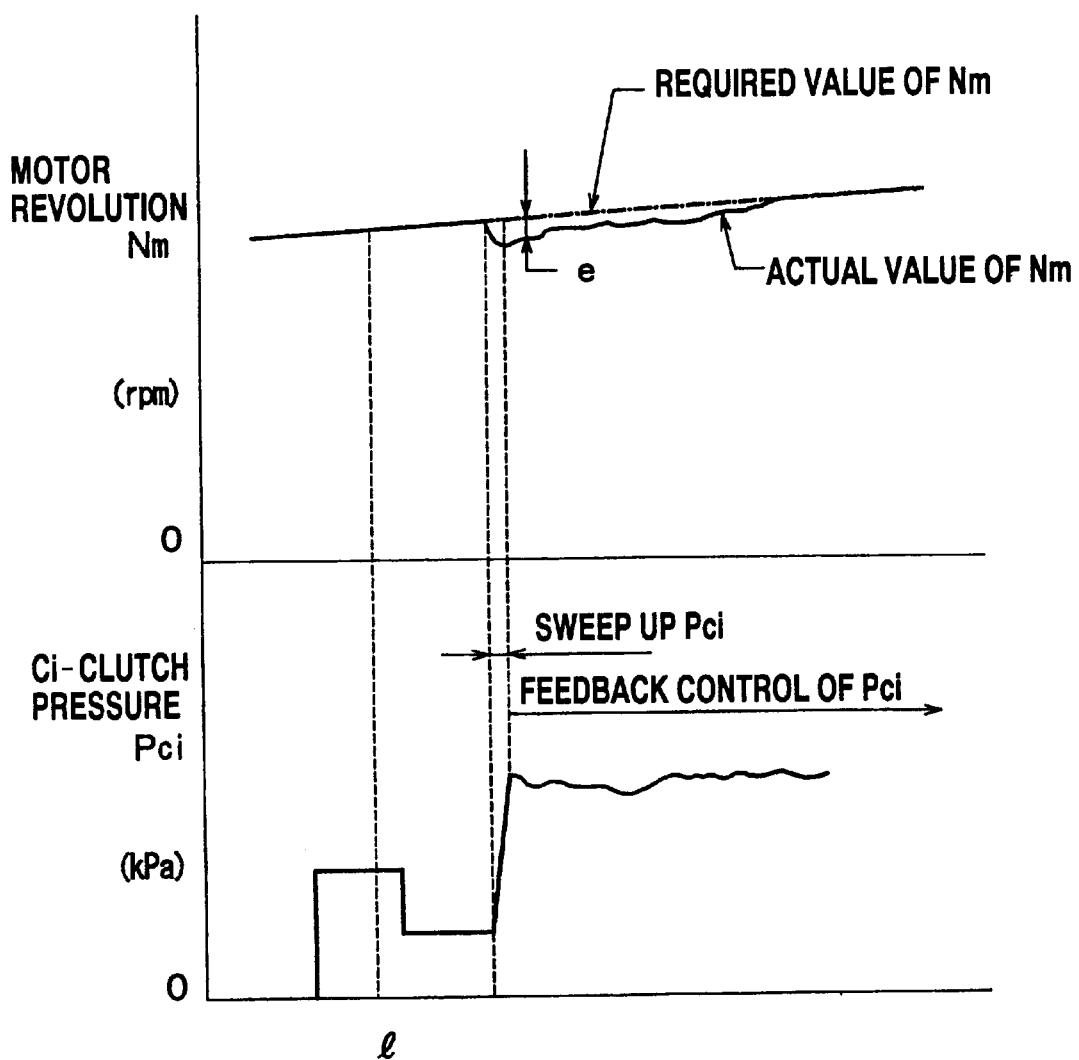
FIG. 11 is a timing chart showing a modification of the starting control according to a second embodiment of the invention.
Figure 12:
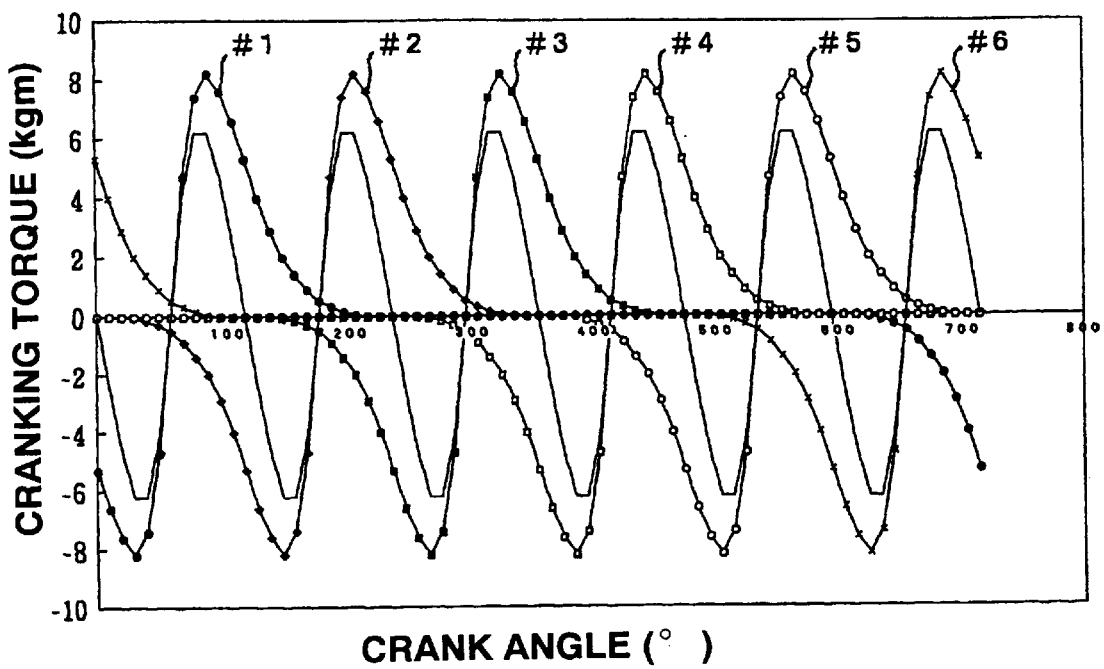
FIG. 12 is a characteristic graph showing torque variance with respect to revolutions of a crank of a generally-employed six-cylinder engine.
Figure 13:
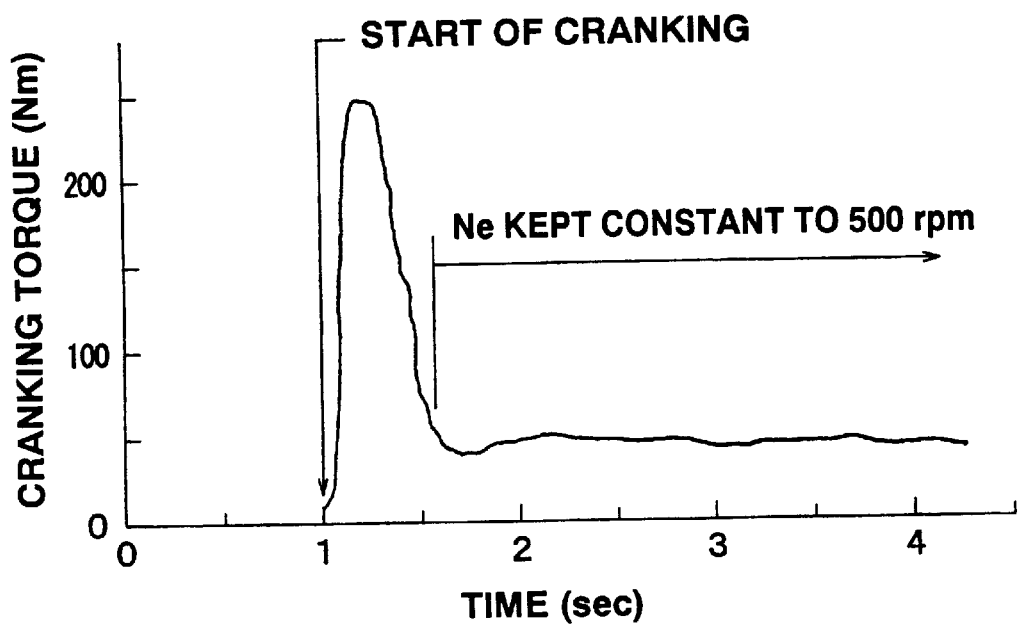
FIG. 13 is a graph showing a cranking torque characteristic of the generally-employed engine.
Figure 14:
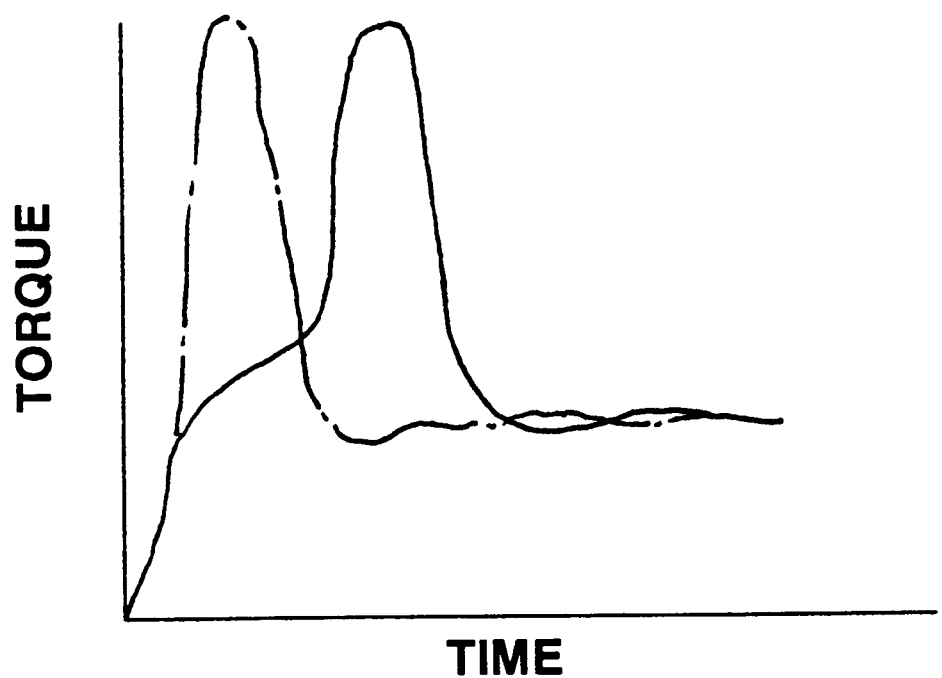
FIG. 14 is a graph showing a start-up characteristic of the above-described cranking torque.

The starting control according to the second embodiment may be modified such that the number of revolutions of the motor traces estimated values. In this case, the control of the output torque from the motor in the starting control is executed in a similar manner to that of the second embodiment. The control of the Ci clutch pressure (Pci) is performed in accordance with a timing chart as shown in FIG. 11. That is, transition of the motor revolution (Nm) from cranking is estimated in accordance with a rate of change in the motor revolution (Nm) prior to the start of cranking by a predetermined time period. Then, a deviation (e) between a required value determined in accordance with the estimated value and the actual motor revolution (Nm) is obtained. In order to cause the motor revolution (Nm) to trace the required values, the output of the Ci clutch pressure (Pci) is feedback-controlled. Preferably, the aforementioned control is performed on the basis of an output (detected speed) from a sensor (a resolver) for detecting the position of a magnetic pole of a motor. The following control is executed in the similar manner to that of the second embodiment.

Although a method may be employed such that the required value of the motor revolution (Nm) is calculated in accordance with the vehicle speed, satisfactory accuracy cannot be obtained because the deviation e according to this modification is very small. If the magnetic-pole sensor of the motor generator is employed, a satisfactory accuracy (about angular degree ranging from tens of seconds to several minutes) can be obtained to also detect the twisting amount of the driving system.

Figure 15:
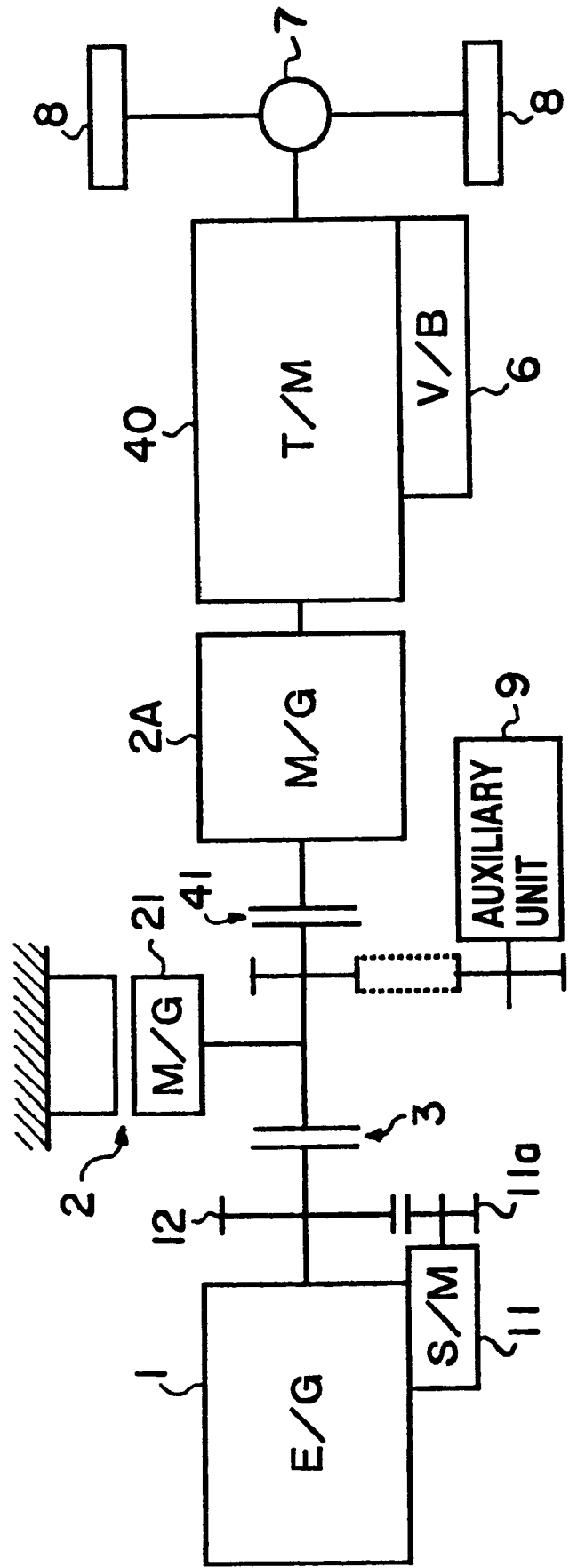
FIG. 15 is a diagram showing the system of a hybrid drive apparatus for a vehicle according to a third embodiment of the invention.

The description has been made such that the control system according to the invention is applied to the driving apparatus having the specific system structure as shown in FIG. 1. A modification of the system structure of the transmission unit 4 will now be described. A third embodiment shown in FIG. 15 has a structure in which a second motor generator (M/G) 2A is disposed between the automatic transmission unit 40 and the Cl-clutch 41 in the transmission unit 4. In this embodiment, an auxiliary unit 9 is operated even if the engine is stopped during running by employing a structure in which the auxiliary unit 9 is connected to the motor generator 2A with a V-belt so as to be operated synchronously. Also the driving apparatus having the aforementioned structure is able to perform the standby control and the starting control by methods similar to those of the aforementioned embodiments. In the foregoing case, upon control of the engine start, the second motor generator 2A is controlled to compensate for the decrease in the torque. Thus, the shock owing to starting the engine can be prevented from being exerted to the passenger on-board. Since the other structures are similar to those of the first embodiment, the same reference numerals are given to corresponding elements. Therefore the corresponding elements are not described.

Figure 16:
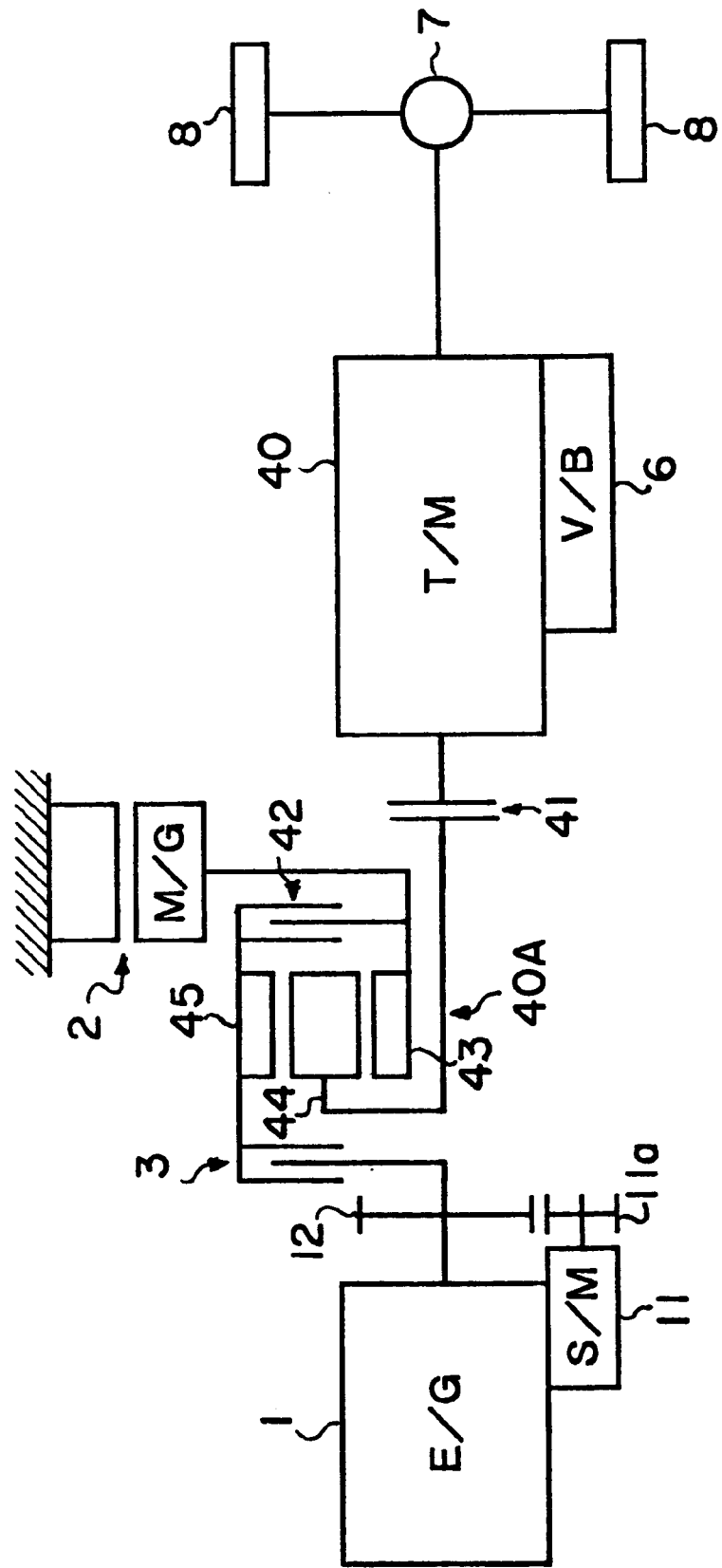
FIG. 16 is a diagram showing the system of a hybrid drive apparatus for a vehicle according to a fourth embodiment of the invention.

A fourth embodiment shown in FIG. 16 has a structure in which a planetary gear 40A having a lock-up clutch 42 for connecting the motor generator 2 to the engine (E/G) 1 and the automatic transmission unit (T/M) 40 disposed in the transmission unit 4. Thus, parallel drive and split drive of the engine 1 and the motor generator 2 can be performed. A sun gear 43 of the planetary gear 40A is connected to the motor generator 2, while a ring gear 45 is connectable to the engine 1. Moreover, the carrier 44 serving as an output element is connected to the automatic transmission unit 40. Other elements constituting the structure are similar to those of the first embodiment. Therefore, the same reference numerals are given to the similar elements and a description of the similar elements is omitted. In this embodiment, when the engine is started by the motor drive method, the lock-up clutch 42 is brought to the engaged state. Moreover, the aforementioned standby control and the starting control are performed to execute the control of the Ci clutch 3 and that of the motor generator 2.

Figure 17:
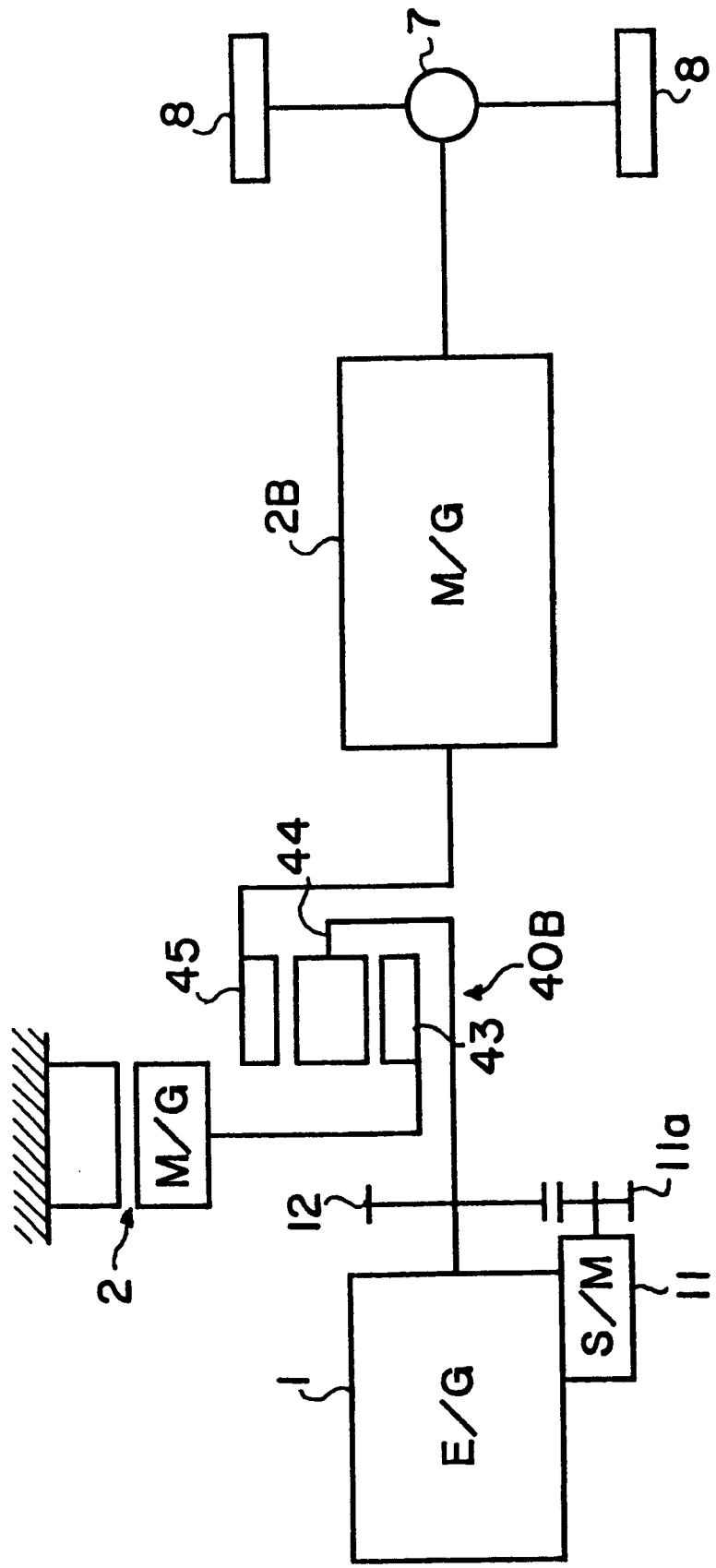
FIG. 17 is a diagram showing a hybrid drive apparatus for a vehicle according to a fifth embodiment of the invention.

A fifth embodiment, shown in FIG. 17, has a structure in which a planetary gear 40B for connecting the motor generator 2 to the engine (E/G) 1 and a second motor generator (M/G) 2B employed in place of the automatic transmission unit are disposed in the transmission unit 4. Contrary to the fourth embodiment, the sun gear 43 of the planetary gear 40B is connected to the motor generator 2, while the carrier 44 is connected to the engine 1. Moreover, the ring gear 45 serving as an output element is connected to the second motor generator (M/G) 2B. This embodiment is structured so that the Ci clutch 3, as an element provided for each of the foregoing embodiments, is removed. With the aforementioned structure of the transmission unit, the motor drive operation is performed such that the motor generator 2B is revolved forwards to drive the vehicle. Where the engine 1 is stopped, support of the reaction by the motor generator 2 is relieved by racing the motor generator 2. When the standby control is performed to start the engine, the first motor generator 2 is slightly revolved forwards with a small output of the torque. Thus, the standby state is realized. Then, the starting control is performed such that the torque of the first motor generator 2 and that of the second motor generator 2B are simultaneously increased. Also in this embodiment, the shock owing to starting the engine can be further minimized in a manner similar to the third embodiment.

Although the invention has been described in its five preferred forms with a certain degree of particularity, it is understood that the present disclosure of the preferred form of the invention can be changed in the details of structure and in the combination and arrangement of parts.

What is claimed is:

1. A hybrid drive apparatus for a vehicle, comprising
an engine;
a motor generator;
a transmission unit capable of transmitting the power of said engine and said motor generator to wheels; and
a control unit for controlling said engine, said motor generator and transmission of power of said engine and said motor generator to the wheels, wherein said control unit incorporates:
starting control means for starting said engine when a vehicle is driven in a state where said engine is stopped and power of said motor generator is transmitted to the wheels, and
standby control means for performing control to revolve said engine to a cranking start position prior to the start of said engine performed by said starting control means.

2. The hybrid drive apparatus according to claim 1, further comprising a clutch between said engine and said motor generator, wherein
said standby control means incorporates standby pressure control means for controlling a clutch pressure such that the capacity of torque transmitted by said clutch becomes a capacity that allows said engine to revolve to the cranking start position.

3. The hybrid drive apparatus according to claim 2, wherein said starting control means incorporates cranking pressure control means for controlling the engagement pressure of said clutch such that the capacity of torque transmitted by said clutch becomes less than or equal to an output torque from said motor generator subsequent to the standby control.

4. The hybrid drive apparatus according to claim 2, further comprising a starter motor for starting said engine, wherein said starting control means directs said starter motor to start and said clutch to be brought to engagement simultaneously after completion of the standby control.

5. A hybrid drive apparatus for a vehicle, comprising:
an engine;
a motor generator;
a clutch capable of controlling power transmission between said engine and said motor generator;
a transmission unit capable of transmitting the power of said engine and said motor generator to wheels; and
a control unit for controlling said engine, said motor generator and said clutch, wherein said control unit incorporates:
starting control means for engaging said clutch so as to start said engine when a vehicle is driven in a state where said engine is stopped, said clutch is disengaged to allow said motor generator to transmit its power to the wheels; and standby control means for performing control to bring said clutch to engagement to revolve said engine to a cranking start position prior to the start of said engine performed by said starting control means, said standby control means incorporating standby pressure control means for controlling the engagement pressure of said clutch such that the capacity of torque transmitted by said clutch becomes a capacity that allows said engine to revolve to the cranking start position, and said starting control means incorporating cranking pressure control means for controlling the engagement pressure of said clutch such that the capacity of torque transmitted by said clutch becomes equal to or lower than an output torque from said motor generator subsequent to the standby control.

6. A hybrid drive apparatus for a vehicle, comprising:

an engine;

a motor generator;

a starter motor for starting said engine;

a clutch capable of controlling power transmission between said engine and said motor generator;

a transmission unit capable of transmitting the power of said engine and said motor generator to wheels; and a control unit for controlling said engine, said motor generator, said starter motor and said clutch, wherein said control unit incorporates:

starting control means for starting said engine when a vehicle is driven in a state where said engine is stopped, said clutch is disengaged and the power of said motor generator is transmitted to the wheels, and standby control means for performing control to bring said clutch to engagement to revolve said engine to a cranking start position prior to the start of said engine performed by said starting control means, said standby control means incorporating standby pressure control means for controlling the engagement pressure of said clutch such that the capacity of torque transmitted by said clutch becomes a capacity that allows said engine to revolve to the cranking start position, and said starting control means starting said starter motor and bringing said clutch to engagement simultaneously with completion of the standby control.

7. The hybrid drive apparatus according to claim 5, wherein said cranking pressure control means incorporates constant acceleration control means for controlling the engagement pressure of said clutch such that a rate of change in the revolutions of said engine is set to a required value.

8. The hybrid drive apparatus according to claim 5, wherein said cranking pressure control means incorporates revolution maintaining and controlling means for controlling the engagement pressure of said clutch such that the rate of decrease in the revolutions of said motor generator becomes less than or equal to a predetermined value.

9. The hybrid drive apparatus according to claim 6, wherein said starting control means incorporates start-up control means for operating said starter motor only for a period of time in which said engine is slightly revolving.

10. The hybrid drive apparatus according to claim 6, wherein said starting control means incorporates cranking pressure setting means for setting the engagement pressure of said clutch to a value with which said clutch transmits an average value of cranking torque of said engine.

11. The hybrid drive apparatus according to claim 6, wherein said starting control means incorporates torque control means for causing said motor generator to produce an output of the average value of the cranking torque of said engine and an output of the torque for driving the vehicle.

12. The hybrid drive apparatus according to claim 6, wherein said starting control means incorporates torque control means for causing said motor generator to produce an output of the torque corresponding to a starting current for said starter motor.

13. The hybrid drive apparatus according to claim 6, wherein a time for operating said starter motor is controlled by a timer.

14. The hybrid drive apparatus according to claim 5, wherein said starting control means incorporates torque control means for causing said motor generator to output maximum torque and pressure increase means for increasing the engagement pressure to increase the torque capacity of said clutch when said motor generator produces an output of maximum torque.

15. The hybrid drive apparatus according to claim 5, wherein said starting control means incorporates torque control means for causing said motor generator to output an average value of cranking torque of said engine.

16. The hybrid drive apparatus according to claim 5, wherein said starting control means incorporates sweep-up means for sweeping up the engagement pressure of said clutch.

17. The hybrid drive apparatus according to claim 5, wherein said standby control means incorporates fast-fill-pressure supply means for shortening a piston stroke of said clutch.

18. The hybrid drive apparatus according to claim 5, wherein said control unit has a clutch standby region set between a motor drive region and an engine drive region.

19. The hybrid drive apparatus according to claim 5, wherein said starting control means supplies fuel to said engine for ignition when the revolutions of said engine have reached a predetermined number of revolutions per unit time.

20. The hybrid drive apparatus according to claim 5, wherein said starting control means brings said clutch to complete engagement subsequent to synchronization of revolutions of said engine and said motor generator.

21. The hybrid drive apparatus according to claim 5, wherein said control unit incorporates completion control means for sweeping down the output torque from said motor generator and enlarging a throttle opening of said engine.

22. The hybrid drive apparatus according to claim 6, wherein said standby control means incorporates fast-fill-pressure supply means for shortening the piston stroke of said clutch.

23. The hybrid drive apparatus according to claim 6, wherein said control unit has a clutch standby region set between a motor drive region and an engine drive region.

24. The hybrid drive apparatus according to claim 6, wherein said starting control means supplies fuel for ignition when the revolutions of said engine have reached a predetermined number of revolutions per unit time.

25. The hybrid drive apparatus according to claim 6, wherein said starting control means brings said clutch to complete engagement subsequent to synchronization of revolutions of said engine and said motor generator.

26. The hybrid drive apparatus according to claim 6, wherein said control unit incorporates completion control means for sweeping down the output torque from said motor generator and enlarging a throttle opening of said engine.

* * * * *